United States Patent
Akkarakaran et al.

(10) Patent No.: US 11,432,188 B2
(45) Date of Patent: Aug. 30, 2022

(54) INDICATING MEDIUM ACCESS CONTROL (MAC)-CONTROL ELEMENT (CE) INFORMATION

(71) Applicant: QUALCOMM Incorporated, San Diego, CA (US)

(72) Inventors: Sony Akkarakaran, Poway, CA (US); Peter Gaal, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/414,679

(22) Filed: May 16, 2019

(65) Prior Publication Data

US 2019/0357078 A1 Nov. 21, 2019

Related U.S. Application Data

(60) Provisional application No. 62/673,800, filed on May 18, 2018.

(51) Int. Cl.
*H04W 28/06* (2009.01)
*H04W 72/04* (2009.01)
(Continued)

(52) U.S. Cl.
CPC ......... *H04W 28/06* (2013.01); *H04W 72/042* (2013.01); *H04W 76/27* (2018.02); *H04W 80/02* (2013.01)

(58) Field of Classification Search
CPC .................................................... H04W 28/06
See application file for complete search history.

(56) References Cited

U.S. PATENT DOCUMENTS

2017/0310431 A1 10/2017 Iyer et al.
2018/0324639 A1* 11/2018 Loehr ................... H04W 28/06
(Continued)

OTHER PUBLICATIONS

Ericsson: "MAC PDU Design", 3GPP Draft, 3GPP TSG-RAN WG2 #97bis, R2-1702738—MAC PDU Design, 3rd Generation Partnership Project (3GPP), Mobile Competence Centre, 650, Route Des Lucioles, F-06921 Sophia-Antipolis Cedex, France, vol. RAN WG2, No. Spokane, USA, Apr. 3, 2017-Apr. 7, 2017, Apr. 3, 2017 (Apr. 3, 2017), XP051244726, pp. 1-3, Retrieved from the Internet: URL: http://www.3gpp.org/ftp/Meetings_3GPP_SYNC/RAN2/Docs/ [retrieved on Apr. 3, 2017], Section 2.
(Continued)

*Primary Examiner* — Edan Orgad
*Assistant Examiner* — Won Tae C Kim
(74) *Attorney, Agent, or Firm* — Holland & Hart LLP

(57) ABSTRACT

Methods, systems, and devices for wireless communications are described. A user equipment (UE) and a base station may communicate medium access control (MAC) protocol data units (PDUs). The UE and base station may use a set of decoding conditions, or a decoding configuration, to identify a set of code block groups (CBGs) within a packet that include MAC-control elements (CEs). For example, the decoding configuration may indicate a fixed set of CBGs which contain the MAC-CEs within a MAC PDU. In another example, the configuration may specify a limit on the number and/or size of the MAC-CEs within each MAC PDU packet. In any case, the decoding configuration may provide rules known by both transmitting and receiving devices for identifying and decoding CBGs that include MAC-CEs such that MAC-CE information may be applied by the receiving wireless device.

29 Claims, 12 Drawing Sheets

(51) Int. Cl.
*H04W 76/27* (2018.01)
*H04W 80/02* (2009.01)

(56) References Cited

U.S. PATENT DOCUMENTS

| | | | | |
|---|---|---|---|---|
| 2018/0368110 | A1* | 12/2018 | Ying | H04L 5/0044 |
| 2020/0178318 | A1* | 6/2020 | Yu | H04W 74/006 |
| 2021/0014881 | A1* | 1/2021 | Aiba | H04L 5/0057 |

OTHER PUBLICATIONS

International Search Report and Written Opinion—PCT/US2019/032814—ISA/EPO—dated Aug. 16, 2019.
Lenovo et al: "Placement of MAC CE Within a TB", 3GPP Draft, 3GPP TSG-RAN WG2 Meeting #98, R2-1705320, 3rd Generation Partnership Project (3GPP), Mobile Competence Centre, 650, Route Des Lucioles, F-06921 Sophia-Antipolis Cedex, France, vol. RAN WG2, No. Hangzhou, China, May 15, 2017-May 19, 2017, May 14, 2017 (May 14, 2017), XP051275762, Retrieved from the Internet: URL: http://www.3gpp.org/ftp/Meetings_3GPP_SYNC/RAN2/Docs/, [retrieved on May 14, 2017], the whole document.
OPPO: "Uplink MAC CE Placement and Indicator", 3GPP Draft, 3GPP TSG RAN WG2#NR_AdHoc#2, R2-1706342—Uplink MAC CE Placement and Indicator, 3rd Generation Partnership Project (3GPP), Mobile Competence Centre, 650, Route Des Lucioles, F-06921 Sophia-Antipolis Cedex, France, vol. RAN WG2, No. Qingdao, China, Jun. 27, 2017-Jun. 29, 2017, Jun. 16, 2017 (Jun. 16, 2017), XP051306401, pp. 3, Retrieved from the Internet: URL: http://www.3gpp.org/ftp/tsg_ran/WG2_RL2/TSGR2_AHs/2017_06_NR/Docs/, [retrieved on Jun. 16, 2017], the whole document.
Qualcomm Incorporated: "Beam Management for NR", 3GPP Draft, 3GPP TSG-RAN WG1 Meeting 93, R1-1807341 Beam Management for NR, 3rd Generation Partnership Project (3GPP),Mobile Competence Centre, 650, Route Des Lucioles, F-06921 Sophia-Antipolis Cedex, France, vol. RAN WG1, No. Busan, Korea, May 21, 2018-May 25, 2018, May 20, 2018 (May 20, 2018), XP051442533, 11 Pages, Retrieved from the Internet:URL:http://www.3gpp.org/ftp/Meetings_3GPP_SYNC/RAN1/Docs/ [retrieved on May 20, 2018], Sections 1-4, 7, 9 and 11.

* cited by examiner

INDICATING MEDIUM ACCESS CONTROL (MAC)-CONTROL ELEMENT (CE) INFORMATION

CROSS REFERENCE

The present Application for Patent claims the benefit of U.S. Provisional Patent Application No. 62/673,800 by Akkarakaran et al., entitled "INDICATING MEDIUM ACCESS CONTROL (MAC)-CONTROL ELEMENT (CE) INFORMATION," filed May 18, 2018, assigned to the assignee hereof, and expressly incorporated by reference in its entirety.

BACKGROUND

The following relates generally to wireless communications, and more specifically to indicating medium access control (MAC)-control element (CE) information.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some cases, exchange of control signaling between wireless devices may involve complex procedures that include attempts to decode received bits and send acknowledgments for the information received. As a result, a wireless device's efficiency may be affected by these complex procedures, particularly when unknown bits are received, and the unknown bits are associated with control signaling intended to be activated by the wireless device.

SUMMARY

The described techniques relate to improved methods, systems, devices, and apparatuses that support indicating medium access control (MAC)-control element (CE) information. Generally, the described techniques provide for a set of decoding conditions, or a decoding configuration, used to decrease decoding complexity of decoding MAC protocol data units (PDUs). The decoding configuration may improve efficiency in identifying, decoding, and applying MAC-CE instructions. In such cases, a MAC PDU may be configured in accordance with a known decoding configuration. For example, the decoding configuration may include a fixed set of code block groups (CBGs) which contain all of the MAC-CEs within the MAC PDU. In another example, the configuration may specify a limit on the number and/or size of the MAC-CEs within each MAC PDU packet. In any case, the decoding configuration may provide rules known by both transmitting and receiving devices for identifying and decoding CBGs that include MAC-CEs. As a result, the receiving device may provide an acknowledgment for the decoded CBGs and subsequently apply received MAC-CE instructions. Further, the application of the MAC-CE may not have to wait for a receiving device (such as a user equipment (UE)) to decode and acknowledge all the other CBGs of the packet. The received MAC-CE instructions may be applied based on, for example, a time period (e.g., three slots, three milliseconds (ms), or the like) after the time that the decoded CBGs were acknowledged, instead of being based on the time that all CBGs of the packet were acknowledged.

A method of wireless communication is described. The method may include receiving, from a wireless device, a packet including a set of CBGs, determining, for the set of CBGs, a decoding configuration that indicates a subset of CBGs which includes one or more MAC subPDUs within the packet, identifying the subset of CBGs based on the determined decoding configuration, and decoding content of the one or more MAC subPDUs based on identifying the subset of CBGs.

An apparatus for wireless communication is described. The apparatus may include a processor, memory in electronic communication with the processor, and instructions stored in the memory. The instructions may be executable by the processor to cause the apparatus to receive, from a wireless device, a packet including a set of CBGs, determine, for the set of CBGs, a decoding configuration that indicates a subset of CBGs which includes one or more MAC subPDUs within the packet, identify the subset of CBGs based on the determined decoding configuration, and decode content of the one or more MAC subPDUs based on identifying the subset of CBGs.

Another apparatus for wireless communication is described. The apparatus may include means for receiving, from a wireless device, a packet including a set of CBGs, determining, for the set of CBGs, a decoding configuration that indicates a subset of CBGs which includes one or more MAC subPDUs within the packet, identifying the subset of CBGs based on the determined decoding configuration, and decoding content of the one or more MAC subPDUs based on identifying the subset of CBGs.

A non-transitory computer-readable medium storing code for wireless communication is described. The code may include instructions executable by a processor to receive, from a wireless device, a packet including a set of CBGs, determine, for the set of CBGs, a decoding configuration that indicates a subset of CBGs which includes one or more MAC subPDUs within the packet, identify the subset of CBGs based on the determined decoding configuration, and decode content of the one or more MAC subPDUs based on identifying the subset of CBGs.

In some examples of the method, apparatuses, and non-transitory computer-readable medium described herein, decoding the content of the one or more MAC subPDUs may include operations, features, means, or instructions for decoding one or more MAC-CEs carried by respective MAC subPDUs of the one or more MAC subPDUs. Some examples of the method, apparatuses, and non-transitory computer-readable medium described herein may further include operations, features, means, or instructions for receiving a first MAC-CE of the one or more MAC-CEs that indicates the decoding configuration, where determining the decoding configuration may be based on decoding the first MAC-CE.

Some examples of the method, apparatuses, and non-transitory computer-readable medium described herein may further include operations, features, means, or instructions for identifying the first MAC-CE as being carried by a MAC subPDU that may be first in a subPDU concatenation within the packet. Some examples of the method, apparatuses, and non-transitory computer-readable medium described herein may further include operations, features, means, or instructions for identifying the first MAC-CE as a temporally first MAC-CE within the packet.

Some examples of the method, apparatuses, and non-transitory computer-readable medium described herein may further include operations, features, means, or instructions for identifying the first MAC-CE as being included in a temporally first CBG of the set of CBGs. Some examples of the method, apparatuses, and non-transitory computer-readable medium described herein may further include operations, features, means, or instructions for identifying the first MAC-CE as being included in a temporally last CBG of the set of CBGs. Some examples of the method, apparatuses, and non-transitory computer-readable medium described herein may further include operations, features, means, or instructions for identifying the first MAC-CE as being included in each CBG of the subset of CBGs or as being included in a temporally first code block (CB) within each CBG of the subset of CBGs.

Some examples of the method, apparatuses, and non-transitory computer-readable medium described herein may further include operations, features, means, or instructions for receiving a retransmission of the subset of CBGs that excludes the first MAC-CE based on decoding a CB that includes the first MAC-CE or decoding a CBG that includes the first MAC-CE. Some examples of the method, apparatuses, and non-transitory computer-readable medium described herein may further include operations, features, means, or instructions for receiving a retransmission of one or more CBGs of the subset of CBGs that exclude the first MAC-CE based on a presence of a flush-indicator set within the subset of CBGs.

Some examples of the method, apparatuses, and non-transitory computer-readable medium described herein may further include operations, features, means, or instructions for identifying, within the subset of CBGs, respective CBs that include a MAC-CE based on a set of bits appended to each of the respective CBs, where decoding the one or more MAC-CEs may be based on identifying the respective CBs.

In some examples of the method, apparatuses, and non-transitory computer-readable medium described herein, the subset of CBGs includes a fixed number of CBGs that include the one or more MAC-CEs. In some examples of the method, apparatuses, and non-transitory computer-readable medium described herein, the decoding configuration indicates a threshold number of MAC-CEs within the packet, or a threshold MAC-CE size within the packet, or a combination thereof.

In some examples of the method, apparatuses, and non-transitory computer-readable medium described herein, decoding the content of the one or more MAC subPDUs may include operations, features, means, or instructions for decoding one or more MAC service data units (SDUs) carried by respective MAC subPDUs of the one or more MAC subPDUs. Some examples of the method, apparatuses, and non-transitory computer-readable medium described herein may further include operations, features, means, or instructions for receiving, from the wireless device, an indication of the decoding configuration, where determining the decoding configuration may be based on the received indication.

In some examples of the method, apparatuses, and non-transitory computer-readable medium described herein, the indication may be received via a master information block (MIB), a system information block (SIB), a radio resource control (RRC) message, a MAC-CE, a downlink control information (DCI) message, or a combination thereof. Some examples of the method, apparatuses, and non-transitory computer-readable medium described herein may further include operations, features, means, or instructions for receiving an indication of the decoding configuration via a temporally first DCI message, a DCI message having a first DCI size that may be different from a second DCI size of a second DCI message, a set of DCI messages, or a combination thereof.

Some examples of the method, apparatuses, and non-transitory computer-readable medium described herein may further include operations, features, means, or instructions for receiving a retransmission of the packet and determining a second subset of CBGs within the retransmission that include the one or more MAC subPDUs based on the decoding configuration. In some examples of the method, apparatuses, and non-transitory computer-readable medium described herein, determining the decoding configuration may include operations, features, means, or instructions for determining the decoding configuration based on a size of the packet, a number of the set of CBGs, a maximum code block (CB) size, or a combination thereof. Some examples of the method, apparatuses, and non-transitory computer-readable medium described herein may further include operations, features, means, or instructions for determining a communication scheme based on at least one of a DCI message or a radio network temporary identifier (RNTI) and applying the decoding configuration based on the determined communication scheme.

In some examples of the method, apparatuses, and non-transitory computer-readable medium described herein, the communication scheme includes ultra-reliable low latency communication (URLLC), enhanced mobile broadband (eMBB), or a combination thereof. In some examples of the method, apparatuses, and non-transitory computer-readable medium described herein, the decoding configuration applies to a respective MAC subPDU of the one or more MAC subPDUs.

In some examples of the method, apparatuses, and non-transitory computer-readable medium described herein, the decoding configuration applies to each MAC subPDU of the one or more MAC subPDUs. Some examples of the method, apparatuses, and non-transitory computer-readable medium described herein may further include operations, features, means, or instructions for transmitting an acknowledgment based on decoding at least one CBG of the subset of CBGs which includes the one or more MAC subPDUs.

DETAILED DESCRIPTION

Figure 1:
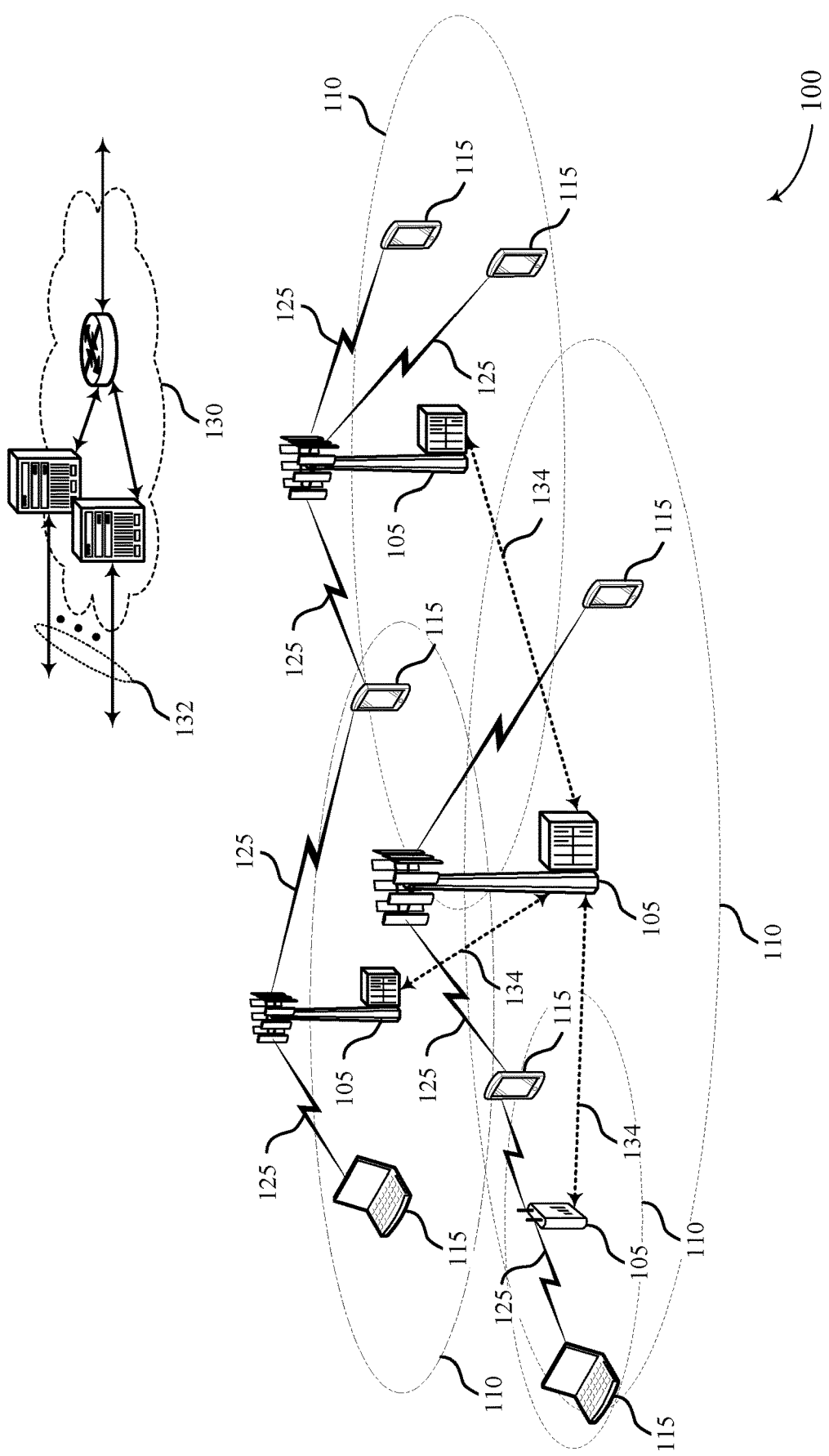
FIG. 1 illustrates an example of a system for wireless communications that supports indicating medium access control (MAC)-control element (CE) information in accordance with aspects of the present disclosure.

In some wireless communications systems, a first wireless device (e.g., a base station) may exchange information with a second wireless device (e.g., a user equipment (UE)) using protocol layer signaling. For example, a base station may transmit messages to a UE indicating some configuration, where these messages may include medium access control (MAC)-control elements (CEs) sent to the UE in downlink signals, such as a physical downlink shared channel (PDSCH) and the like. The UE may receive and decode the signal carrying the MAC-CEs and may subsequently transmit an acknowledgement (ACK) message to the base station acknowledging successful reception of the downlink signal. The ACK message may, for example, be transmitted to the base station in either a physical uplink control channel (PUCCH) or physical uplink shared channel (PUSCH). The UE may activate MAC-CE commands after a certain amount of time (e.g., a defined number of slots or symbol periods) from the ACK message transmission.

Alternatively, a UE may be transmitting uplink MAC-CE commands to a base station, where the ACK message sent from a base station (e.g., an ACK sent on a channel, such as a long term evolution physical hybrid automatic repeat request (LTE P-HICH) channel or an uplink grant scheduling new data via a new data indicator (NDI) toggle) may indicate the successful reception of the uplink signal. In this case, the base station may activate the uplink MAC-CE commands after an amount of time from transmitting its ACK message. In some cases, the process of a first wireless device receiving the signal carrying the MAC-CEs, transmitting an ACK message, and activating the MAC-CE commands may be complex, leading to inefficiencies and poor coordination between wireless devices.

In some wireless communications systems, MAC protocol data units (PDUs) (or packets) may include one or more MAC sub-protocol data units (subPDUs), where different subPDUs may include MAC-CEs, MAC-service data units (SDUs), or padding. Each MAC PDU may be segmented into code blocks (CBs), and the CBs may be grouped into sets of code block groups (CBGs). In some cases, a feedback or ACK message may indicate the status of decoding the MAC PDU or CBGs of the MAC PDU (e.g., including the MAC-CEs), and may further indicate to the transmitting device that a MAC-CE command has been received and will be activated at the receiving wireless device. For example, a feedback message may indicate the status of decoding the entire MAC PDU, a CBG of the MAC PDU, or a set of CBGs of the MAC PDU.

In some instances, the number, location (e.g., a concatenation order, a time when received, etc.), and size of the MAC-CEs within the packet may be variable. Accordingly, depending on the granularity of the feedback message (i.e., whether the feedback message indicates an ACK/negative acknowledgment (NACK) for a single CBG, multiple CBGs, or the entire MAC PDU), a wireless device transmitting the MAC PDU may retransmit a portion of the MAC PDU (e.g., a single CBG), or alternatively, may retransmit the entire MAC PDU. Once a MAC PDU or portion of a MAC PDU has been successfully decoded (and consequently ACK-ed), the receiving device may begin layer 2 (L2) parsing to identify the elements within the MAC PDU (e.g., MAC headers, MAC-CEs, MAC SDUs).

In some cases, the wireless device receiving the MAC PDU may decode the embedded MAC-CEs according to decoding conditions. For example, the decoding conditions may specify a direct decoding scheme. The direct decoding scheme may include both a transmitting device (e.g., a base station) and a receiving device (e.g., a UE) agreeing on a set of conditions dictating when a MAC-CE can be successfully decoded. The conditions may depend on variables such as the content of each MAC-CE, the size of the MAC-CE, the order of the MAC-CEs, other MAC headers, etc. In some cases, the direct decoding scheme may further require each CBG of a MAC PDU to be decoded sequentially. This may be a complex process, particularly in cases where there is a large number of retransmissions due to failed decoding (e.g., due to poor link conditions). Further, a receiving device operating according to a direct decoding scheme may conduct L2 parsing after each new CB or CBG decodes, leaving un-decoded bits as unknown until the appropriate CB or CBG has been decoded. In some cases, the receiving device may repeat L2 parsing after decoding each CBG, as the receiving device may not transmit ACK feedback for individual CBs.

The direct decoding scheme may require several L2 parsing operations for MAC PDUs including multiple CBGs, particularly when there may be a large maximum number of hybrid automatic repeat request (HARQ) retransmissions and/or in scenarios in which CBGs may be decoded sequentially. For example, if all received CBGs may be decoded at the same time, then a single L2 parsing process may be used. However, if only some CBGs may be decoded at a first HARQ transmission, then a few more CBGs at a next HARQ transmission, and so on, then several L2 parsings may be performed (particularly if a maximum number of HARQ transmissions is relatively large (in which case this process may go on for longer durations)). The number of HARQ transmissions used to receive all CBGs, and the number of L2 parsing procedures may be a function of channel conditions experienced when the CBGs are received.

As described herein, wireless devices may agree on a streamlined set of decoding conditions, or a decoding configuration, to remove the decoding complexity described above, thereby improving efficiency in identifying, decoding, and applying MAC-CE instructions. In such cases, the MAC PDU may be configured in accordance with a known decoding configuration. For example, the decoding configuration may include a fixed set of CBGs which contain all of the MAC-CEs within the MAC PDU packet or the MAC-CEs of a particular type (e.g., a type of functionality of a MAC-CE, such as beam switching, semi-persistent scheduling (SPS) activation and/or deactivation, etc.). More generally, instead of indicating a fixed set of CBGs containing certain MAC-CEs, the configuration may include a fixed set (e.g., S) of CBGs whose decoding allows identification and decoding of certain MAC-CEs. These MAC-CEs may be different from the CBGs in the set S. For example, the CBGs may be included in the CBGs of another set (e.g., S'), which may either be a subset of S or may contain other CBGs not in S. In some examples, the CBGs of set S' may be identified by decoding the CBGs in the set S. In such cases, the identification may include reading other MAC-CEs or sub-PDUs from the decoded CBGs in the set S. Accordingly, a base station may determine that a UE has decoded the MAC-CEs if the UE sends ACK for all the CBGs in both sets (e.g., S and S'). It is noted that the described scheme may be further extended, where the set S' may not enable completing the decoding of the MAC-CEs, but may, in turn, identify an additional set (e.g., S'') that may enable completing the decoding. In another example, the configuration may specify a limit on the number and/or size of the MAC-CEs within each MAC PDU packet, which may in turn identify a fixed set of CBGs (e.g., set S, as described above). In any case, the decoding configuration may provide rules known by both transmitting and receiving devices for identifying and decoding CBGs that include MAC-CEs.

Aspects of the disclosure are initially described in the context of a wireless communications system. Additional aspects of the disclosure are then described with respect to decoding configurations and a process flow. Aspects of the disclosure are further illustrated by and described with reference to apparatus diagrams, system diagrams, and flowcharts that relate to indicating MAC-CE information.

FIG. 1 illustrates an example of a wireless communications system 100 that supports indicating MAC-CE information in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A MAC layer may perform priority handling and multiplexing of logical channels into transport channels. The MAC layer may also use hybrid automatic repeat request (HARD) to provide retransmission at the MAC layer to improve link efficiency. Additionally, the MAC layer may schedule transmissions carried out on the air interface and control low-level operation of the Physical (PHY) layer. In the control plane, the Radio Resource Control (RRC) protocol layer may provide establishment, configuration, and maintenance of an RRC connection between a UE 115 and a base station 105 or core network 130 supporting radio bearers for user plane data. At the PHY layer, transport channels may be mapped to physical channels.

In some cases, the MAC layer may send and receive MAC-CEs for the communication of control information between different wireless devices. Different MAC-CEs may include different instructions to be applied by a wireless device. For example, MAC-CEs may include information related to buffer status reports, random access procedures, power headroom reporting, discontinuous reception operation, timing advance control, contention procedures, scheduling, activation/deactivation of cells, and so forth. MAC-CE may be carried within MAC PDUs, which may be sent on a transport channel to the PHY layer for transmission. In some examples, a MAC PDU may be segmented into multiple MAC subPDUs, where various subPDUs may include the MAC-CEs that carry instructions or a configuration intended for another wireless device. Additionally, respective MAC-CEs may be different sizes (e.g., a different number of bits) or may have a fixed size.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval. In some cases, redundancy bits may be added to each message prior to transmission. In other cases, redundancy bits are not added to each transmission, but are retransmitted after the transmitter of the original message receives a NACK indicating a failed attempt to decode the information.

A physical downlink control channel (PDCCH) carries downlink control information (DCI) in control channel elements (CCEs), which may consist of nine logically contiguous resource element groups (REGs), where each REG contains 4 resource elements (REs). DCI includes information regarding downlink scheduling assignments, uplink resource grants, transmission scheme, uplink power control, HARQ information, a modulation and coding scheme (MCS), and other information. The size and format of the DCI messages can differ depending on the type and amount of information that is carried by the DCI. For example, if spatial multiplexing is supported, the size of the DCI message is large compared to contiguous frequency allocations. Similarly, for a system that employs MIMO, the DCI must include additional signaling information. DCI size and format depend on the amount of information as well as factors such as bandwidth, the number of antenna ports, and duplexing mode.

PDCCH can carry DCI messages associated with multiple users, and each UE 115 may decode the DCI messages that are intended for it. For example, each UE 115 may be assigned a C-RNTI and CRC bits attached to each DCI may be scrambled based on the C-RNTI. To reduce power consumption and overhead at the user equipment, a limited set of control channel element (CCE) locations can be specified for DCI associated with a specific UE 115. CCEs may be grouped (e.g., in groups of 1, 2, 4 and 8 CCEs), and a set of CCE locations in which the user equipment may find relevant DCI may be specified. These CCEs may be known as a search space. The search space can be partitioned into two regions: a common CCE region or search space and a UE-specific (dedicated) CCE region or search space. The common CCE region is monitored by all UEs served by a base station 105 and may include information such as paging information, system information, random access procedures and the like. The UE-specific search space may include user-specific control information. CCEs may be indexed, and the common search space may start from CCE 0. The starting index for a UE specific search space depends on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt descramble all potential DCI messages using its C-RNTI, and perform a CRC check to determine whether the attempt was successful.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency-division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds (µs)). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may support the use of rules that identify which CBGs of a packet include MAC-CEs. For example, a first wireless device (e.g., a base station 105) may transmit messages to a second wireless device (e.g., a UE 115) indicating a configuration, where these messages may include media access control MAC-CEs. The second wireless device may receive and decode the signal carrying the MAC-CEs and may subsequently transmit an ACK message to the first wireless device acknowledging successful reception of the downlink signal. The second wireless device may activate MAC-CE commands after an amount of time (e.g., a defined number of symbol periods) from the ACK message transmission. In some instances, the number, location (e.g., a concatenation order, a time when received, etc.), and size of the MAC-CEs within the packet may be variable. Accordingly, depending on the granularity of the feedback message (i.e., whether the feedback message indicates an ACK/NACK for each CBG, or for the entire MAC PDU), a wireless device transmitting the MAC PDU may retransmit a portion of the MAC PDU (e.g., NACK-ed CBGs), or alternatively, may retransmit the entire MAC PDU. Once a MAC PDU or portion of a MAC PDU has been successfully decoded (and consequently ACK-ed), the receiving device may begin L2 parsing to identify the elements within the MAC PDU (e.g., MAC headers, MAC-CEs, MAC SDUs).

In some cases, the wireless device receiving the MAC PDU may decode the embedded MAC-CEs according to decoding conditions. As described herein, wireless devices may agree on a streamlined set of decoding conditions, or a decoding configuration, in order to remove the decoding complexity described above, thereby improving efficiency in identifying, decoding, and applying MAC-CE instructions. In such cases, the MAC PDU may be configured in accordance with a known decoding configuration. For example, the decoding configuration may include a fixed set of CBGs which contain all of the MAC-CEs within the MAC PDU packet. In another example, the configuration may specify a limit on the number and/or size of the MAC-CEs within each MAC PDU packet. In either case, the decoding configuration may provide rules known by both transmitting and receiving devices for decoding CBGs that include MAC-CEs.

Through the described techniques, the application of the MAC-CE may not have to wait for a receiving device (such as a UE 115) to decode and acknowledge all the other CBGs of the packet. Thus, the time of application of instructions within a received MAC-CE instruction may be based on, for example, a time period (e.g., a quantity of slots, a quantity of time, or the like) after the time that the decoded CBGs were acknowledged, instead of being based on the time that all CBGs of the packet were acknowledged. As such, communications efficiency may be improved within the system.

Figure 2:
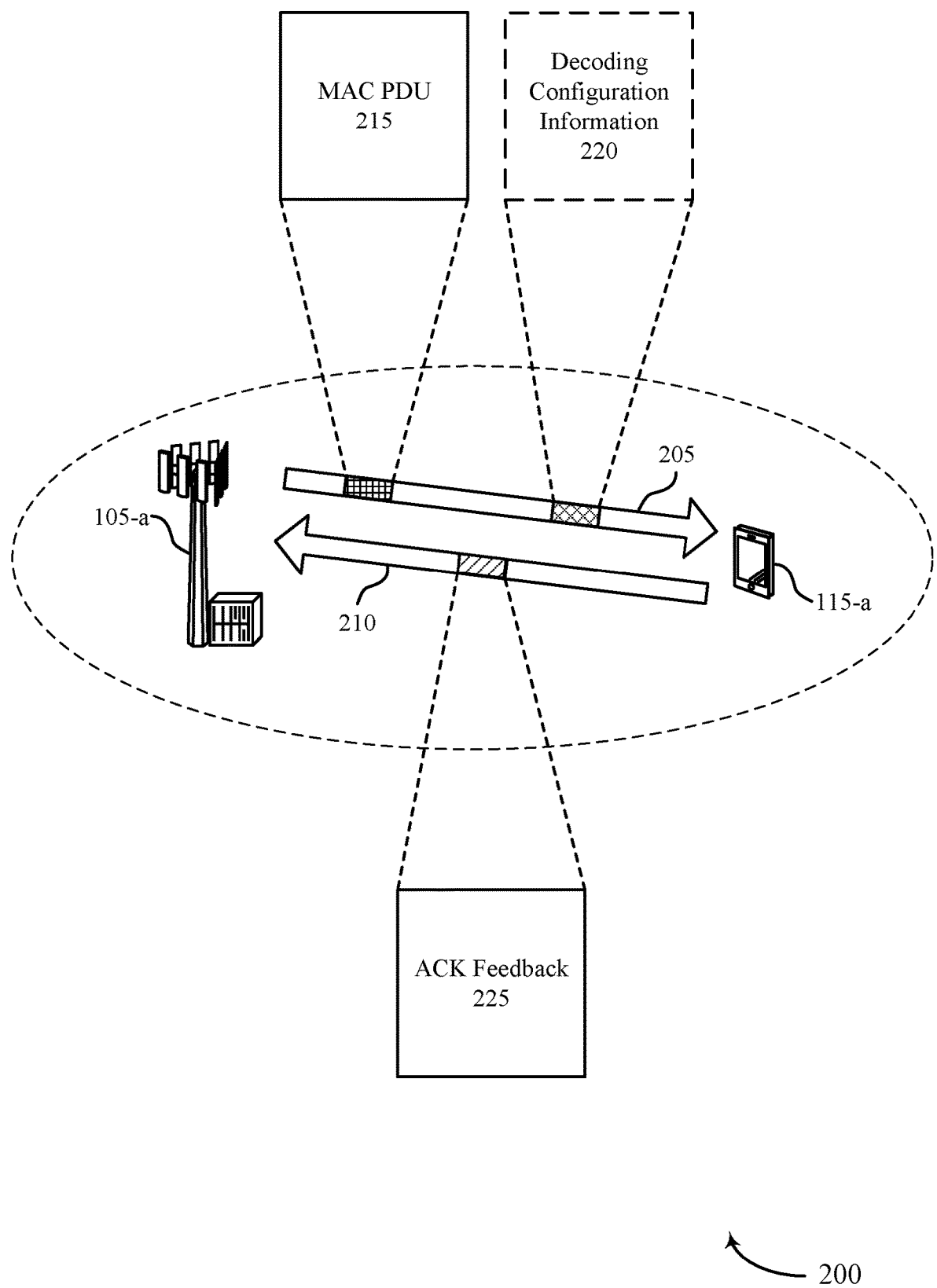
FIG. 2 illustrates an example of a wireless communications system that supports indicating MAC-CE information in accordance with aspects of the present disclosure.

FIG. 2 illustrates an example of a wireless communications system 200 that supports indicating MAC-CE information in accordance with aspects of the present disclosure. In some examples, wireless communications system 200 may implement aspects of wireless communications system 100. Wireless communications system 200 includes a base station 105-a and a UE 115-a, which may be examples of corresponding base stations 105 and UEs 115 as described with reference to FIG. 1. It is noted that the techniques and processes described herein as being performed by either UE 115-a or base station 105-a may also be performed by the other device. That is, the techniques described herein with reference to methods performed by UE 115-a may also be performed by base station 105-a, and vice versa. Therefore, the described decoding schemes and associated techniques used for downlink signals sent from base station 105-a to UE 115-a, may also be utilized for uplink signals sent from UE 115-a to base station 105-a.

As described herein, base station 105-a and UE 115-a may communicate via downlink channel 205 and uplink channel 210. In some cases, base station 105-a may transmit a packet containing MAC PDU 215 via downlink channel 205. MAC PDU 215 may include one or more MAC-CEs. Upon successfully decoding MAC PDU 215, and consequently the one or more MAC-CEs, UE 115-a may transmit an ACK message in ACK feedback 225 to base station 105-a to acknowledge the successful reception of MAC PDU 215. In some cases, UE 115-a may receive and decode the entire MAC PDU 215 prior to sending ACK feedback 225 to base station 105-a. As a result, UE 115-a may determine whether each of the MAC-CEs within MAC PDU 215 was successfully decoded after receiving and decoding the entire MAC PDU 215. Additionally or alternatively, UE 115-a may transmit per-CBG feedback for CBGs included within MAC PDU 215. In such cases, UE 115-a may transmit ACK feedback 225 to base station 105-a upon successfully decoding each CBG of MAC PDU 215, or may wait until all CBGs of MAC PDU 215 have been received before transmitting ACK feedback 225.

In some examples, base station 105-a may utilize a decoding configuration that imposes certain limitations on where each MAC-CE is transmitted within MAC PDU 215. The decoding configuration may, for example, indicate a fixed set of CBGs within MAC PDU 215 that may contain a MAC-CE. In such cases, UE 115-a may determine, once each of the indicated CBGs has been successfully received and decoded, that base station 105-a may not transmit additional MAC-CEs within MAC PDU 215. In another example, the decoding configuration may apply some other types of limitations on MAC-CEs within MAC PDU 215. For example, the decoding configuration may indicate a maximum number and/or size of MAC-CEs within MAC PDU 215. Additionally or alternatively, the decoding configuration may indicate a similar limit on the CBGs containing MAC-CEs. In either example, UE 115-a may identify the decoding configuration, which may allow UE 115-a to determine the successful decoding of the MAC-CEs prior to receiving and decoding all of MAC PDU 215. In some cases, the decoding configuration may indicate to UE 115-a that UE 115-a has received and decoded all of the MAC-CEs contained in MAC PDU 215 prior to UE 115-a receiving the entirety of MAC PDU 215. This may allow UE 115-a to perform L2 parsing of the received MAC-CEs before receiving and decoding all of MAC PDU 215 (e.g., early L2 parsing prior to receipt of all CBGs of MAC PDU 215).

In some cases, the decoding configuration may be static or dynamic and known by both base station 105-a and UE 115-a. For example, the decoding configuration may be preconfigured at both base station 105-a and UE 115-a. In this example, the decoding configuration may differ depending on a type of communication. For example, for downlink communications, the decoding configuration may indicate a fixed set of CBGs that may contain MAC-CEs, where the set of CBGs includes a temporally first CBGs of MAC PDU 215 (e.g., a CBG that is transmitted before other CBGs). However the decoding configuration for uplink communications may instead dictate a fixed set of CBGs for MAC-CE transmissions that includes the last CBGs of a MAC PDU packet. In this context, "first" and "last" CBG may be defined with respect to the indexing of the code-blocks in the procedure to segment the MAC-PDU into code-blocks, and of CBGs created by grouping these code-blocks.

In another example, base station 105-a may utilize a different decoding configuration for ultra-reliable low latency communication (URLLC) than for enhanced mobile broadband (eMBB). For example, in downlink communications, URLLC traffic may indicate a streamlined decoding configuration indicated by base station 105-a, where the URLLC MAC PDU feedback is provided on a per-CBG basis, while eMBB traffic (which may, for example, be less affected by latency) may indicate a direct decoding scheme, where the eMBB MAC PDU feedback relates to MAC PDU 215 as a whole. For uplink communications, a decoding configuration may indicate URLLC MAC-CEs be transmitted within the temporally first CBGs, while indicating that eMBB MAC PDUs be configured according to a direct decoding scheme.

In some examples, the decoding configuration may be partially or fully conveyed in the transmitted CBGs themselves (e.g., a first MAC-CE indicates the configuration), or may be separately conveyed (e.g., using RRC configuration), where the decoding configuration may be indicated to UE 115-a by base station 105-a. For example, base station 105-*a* may indicate a decoding configuration to UE 115-*a* in decoding configuration information 220. Decoding configuration information 220 may indicate the decoding configuration for the single MAC PDU 215 or alternatively, for more than one MAC PDU (e.g., the indication may signal the decoding configuration for MAC PDU transmissions until base station 105-*a* transmits a new decoding configuration to UE 115-*a*). In some cases, base station 105-*a* may transmit decoding configuration information 220 via MIB, SIB, RRC, MAC-CE, or downlink control information (DCI). Base station 105-*a* may indicate the decoding configuration information 220 either explicitly or implicitly. For example, base station 105-*a* may explicitly indicate a decoding configuration by transmitting the indices of the CBGs that may contain MAC-CEs. Alternatively, UE 115-*a* may implicitly determine the decoding configuration as a function of other parameters within the signaled indication. For instance, a parameter (e.g., a packet size, number of CBGs, maximum CB size) of the indicator medium (e.g., MIB, SIB, RRC, MAC-CE, DCI) may indicate the decoding configuration to UE 115-*a*. Decoding configuration information 220 may also include information regarding the type of communications (e.g., URLLC vs. eMBB). In some cases, the decoding configuration may change based on the type of communications.

In a first example, base station 105-*a* may transmit decoding configuration information 220 using RRC signaling. Because RRC may take more time to change (e.g., as compared to DCI signaling), indicating a decoding configuration via RRC may be less dynamic than other techniques, but may be suitable in cases where base station 105-*a* may not need to adapt decoding configurations, for example, on a packet-by-packet basis. In a second example, base station 105-*a* may indicate decoding configurations via DCI or a radio network temporary identifier (RNTI). In such cases, DCI or the RNTI may indicate whether transmitted information (such as a resource grant) is for a particular communications scheme (e.g., URLLC, eMBB, etc.), and the corresponding decoding configuration for the communications scheme may be applied based on the indication. DCI may allow for a more dynamic configuration than RRC signaling. Because DCI may be transmitted every time MAC PDU 215 is transmitted (i.e., including any retransmissions), DCI may provide a highly dynamic method of signaling the decoding configuration. However, base station 105-*a* may not need to adjust decoding configurations as often as the DCI is transmitted. In some cases, there may be different sizes of DCI defined, where the size of DCI depends on whether there is an updated decoding configuration. In this example, UE 115-*a* may decode DCI according to each possible size defined, which may increase the number UE 115-*a*'s number of blind decodes. For example, if there are two different possible DCI sizes defined, UE 115-*a* may decode the DCI according to each possibility in order to determine if there is an updated decoding configuration defined.

In some other cases, base station 105-*a* may transmit redundant decoding configuration information 220 within DCI (i.e., in the case of full DCI configuration). For example, UE 115-*a* may not successfully decode each MAC-CE within MAC PDU 215. UE 115-*a* may then transmit a NACK via ACK feedback 225 indicating which CBGs within MAC PDU 215 were not successfully decoded. In the ensuing HARQ retransmission, base station 105-*a* may retransmit the CBGs of MAC PDU 215 indicated via the NACK, where each of the retransmitted CBGs may be transmitted according to the previously defined decoding configurations. That is, the information on which CBGs of a packet carry MAC-CEs may not change across HARQ retransmissions. However, base station 105-*a* may still transmit the redundant decoding configuration information 220 via DCI. In such cases, UE 115-*a* may utilize the decoding configuration information 220 within the first DCI transmission (e.g., UE 115-*a* may not use the decoding configuration information 220 sent within the DCI associated with retransmissions). In some cases, base station 105-*a* may transmit other relevant information to UE 115-*a* via DCI (e.g., instead of decoding configuration information 220) during any retransmissions, thus decreasing redundancy. In a third example, base station 105-*a* may transmit decoding configuration information 220 within a specific MAC-CE of MAC PDU 215, where the specific MAC-CE contains an indication regarding the decoding configuration for other MAC-CE transmissions within MAC PDU 215. Such examples may also allow for a decoding configuration to be transmitted together with MAC PDUs that are transmitted on grants that may not have an associated DCI (e.g., configured or semi-persistent scheduling (SPS) grants).

In some examples, base station 105-*a* may place the specific MAC-CE within a CBG that is known to UE 115-*a*. For example, the specific MAC-CE may be transmitted within the first CBG of a packet. In some cases, a decode latency associated with the MAC-CEs in MAC PDU 215 (e.g., the amount of time between UE 115-*a* receiving MAC PDU 215 and decoding each MAC-CE within MAC PDU 215) may be related to the placement of the specific MAC-CE. The decode latency may be larger if the specific MAC-CE is placed later within MAC PDU 215 than if the specific MAC-CE is placed earlier within MAC PDU 215. In some cases, transmissions with low latency requirements (e.g., URLLC transmissions) may utilize specific MAC-CEs concatenated first within MAC PDU 215. For instance, a subPDU containing a specific MAC-CE may be the first subPDU concatenated within MAC PDU 215. In some cases, once UE 115-*a* has decoded the specific MAC-CE of MAC PDU 215, any additional MAC-CE may become redundant in future retransmissions, where base station 105-*a* may re-encode future CBGs without the specific MAC-CE information. Alternatively, base station 105-*a* may re-encode CBGs with a flush-indicator set. In this example, if the flush-indicator is set, a MAC-CE that has already been decoded may be removed in the ensuing retransmissions. However, if the flush-indicator is not set, the retransmission may include the same CBGs as the previous retransmission.

In some examples, base station 105-*a* may transmit a specific MAC-CE with decoding configuration information 220 within each CB or CBG. For example, base station 105-*a* may transmit a specific MAC-CE within the temporally first CB of each CBG or, alternatively, with the temporally last CB of each CBG. In this example, base station 105-*a* may transmit the specific MAC-CE within a CBG if more than one CB is present for that CBG. In some cases, each CB may have a fixed number of bits appended. In this case, a specific MAC-CE may be transmitted within the appended bits, and each specific MAC-CE may either by limited to a size that can be accommodated by the number of appended bits or span the appended bits of multiple CBs. In some examples, a first CB of a CBG may include specific MAC-CE data. In the remaining CBs of the CBG, base station 105-*a* may transmit non-specific MAC-CE data.

Although the techniques described herein include identifying the CBGs that carry a MAC-CE, to facilitate early acknowledgment and activation of the MAC-CE commands, the same techniques also may be used to acknowledge other specific types of MAC subPDUs as well. For example, the described techniques may also facilitate other actions based on such acknowledgments, such as determining whether to retransmit subPDU content in a subsequent MAC PDU. For example, an uplink MAC-CE (e.g., including a buffer status report, power headroom report etc.) may be transmitted periodically or in response to a trigger. In some cases, HARQ failure of a MAC PDU containing such MAC-CEs (e.g., decode failures after a maximum number of HARQ retransmission attempts have been reached) may not result in retransmissions of these MAC-CEs with future MAC PDUs. In such cases, a triggering condition for the transmission of these MAC-CEs may be canceled as soon as they are included in a MAC PDU for transmission, regardless of whether that transmission was successful.

For some MAC-CEs, it may be beneficial to cancel the trigger condition after HARQ success is confirmed. For instance, HARQ success may be interpreted as a successful decoding of an entire MAC PDU 215 (e.g., of all the CBGs carried by MAC PDU 215), which may cause unnecessary retransmission of the MAC-CE upon HARQ failure, even though the CBGs containing the MAC-CE were decoded. However, the techniques described herein may allow for identifying the CBGs containing the MAC-CE, and thus avoiding these unnecessary retransmissions once it has been determined that those CBGs have decoded. Similarly, acknowledgment of CBGs of a MAC PDU that contain specific MAC subPDUs (not necessarily limited to those carrying MAC-CEs, as in the previous example) may also avoid some retransmissions in the event of HARQ failure. As an example, specific MAC subPDUs could be those carrying MAC SDUs corresponding to a specific logical channel-ID, and those SDUs may not be retransmitted with later MAC PDUs in the event of HARQ failure for the MAC PDU (e.g., if not all CBGs of the MAC PDU were successfully decoded even after all allowed HARQ retransmissions). Further, the methods described herein may be used to identify the CBGs that carry these specific MAC subPDUs.

The described techniques may be used by a wireless device (e.g., UE 115-*a* and base station 105-*a*) to facilitate efficient decoding of received signals. For example, the use of the decoding configurations described herein may decrease or remove decoding complexity for received information (such as information carried on MAC-CEs), thereby improving efficiency in identifying, decoding, and applying instructions received from another device. Accordingly, the wireless device may save time when processing MAC-CE information, and may also save battery power (e.g., as in the case of UE 115-*a*) through the use of less-complex operations in decoding received signaling, which may extend the battery life of the wireless device because less energy is used when processing a received signal.

Figure 3A:
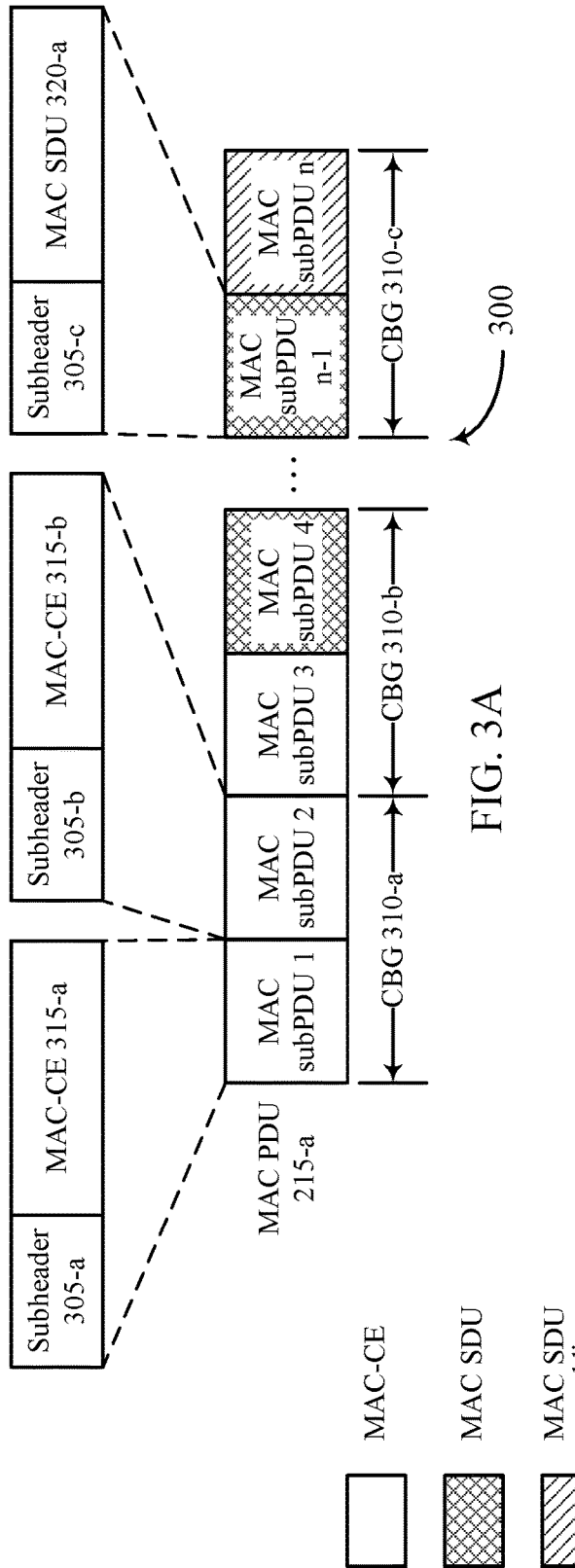
FIGS. 3A and 3B illustrate an example of decoding configurations that support indicating MAC-CE information in accordance with aspects of the present disclosure.
Figure 3B:
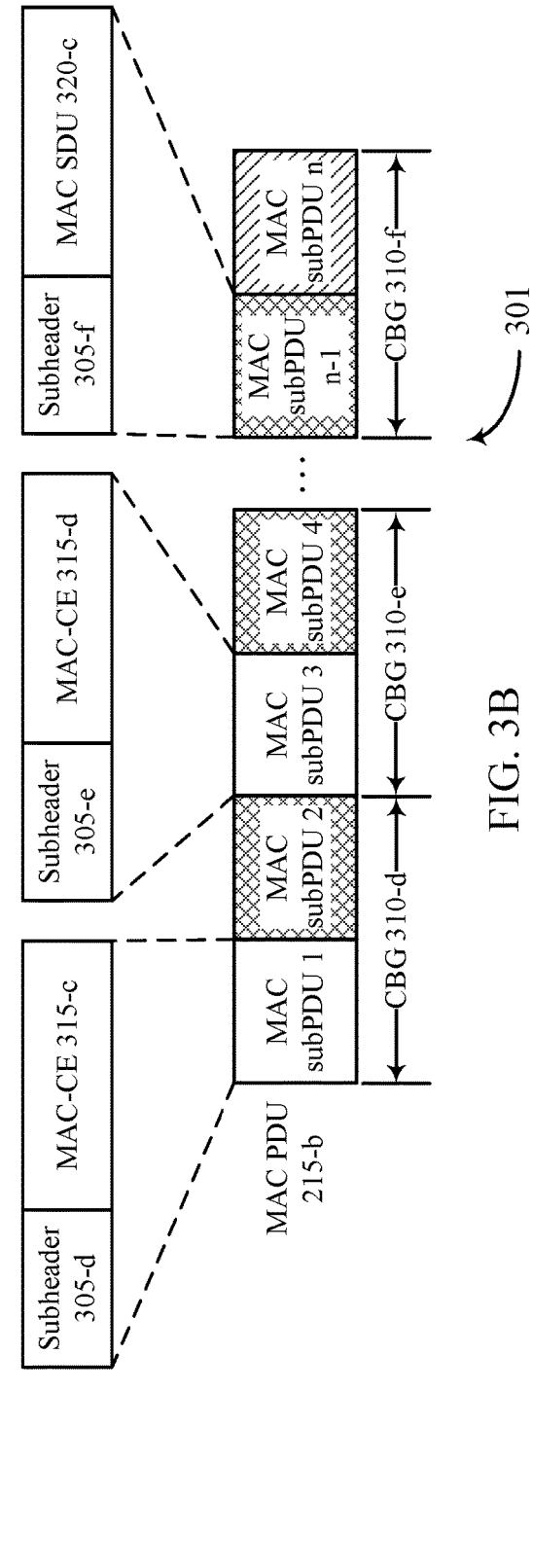

FIGS. 3A and 3B illustrate examples of decoding configurations 300 and 301, respectively, that support indicating MAC-CE information in accordance with aspects of the present disclosure. In some examples, decoding configurations 300 and 301 may implement aspects of wireless communications system 100 and 200. For example, MAC PDUs 215-*a* and 215-*b* may be examples of the MAC PDU sent by base station 105-*a* to UE 115-*a* in wireless communications system 200. Further, MAC PDUs 215-*a* and 215-*b* may correspond to a decoding configuration as discussed with reference to FIG. 2. In these examples, both a receiving wireless device (e.g., a UE) and a transmitting device (e.g., a base station) may determine decoding configurations 300 or 301. The decoding configurations 300 and 301 may be static (e.g., preconfigured) or dynamic (e.g., indicated to the receiving device by the transmitting device), or a combination thereof.

MAC PDUs 215 may be divided into n subPDUs concatenated together to form MAC PDU 215, where each MAC subPDU contains a subheader 305. Each subPDU may also optionally include a MAC SDU 320, a MAC-CE 315, padding, or combinations thereof. In some cases, MAC PDUs 215 may be divided into CBGs 310 for transmission. In some cases, a receiving device may receive CBG 310-*a* or 310-*d* first, CBG 310-*b* or 310-*e* second, and CBG 310-*c* or 310-*f* last. Although FIGS. 3A and 3B depict two MAC subPDUs being transmitted in every CBG 310, it may be appreciated by one skilled in the art that a CBG 310 may include less MAC subPDUs or more MAC subPDUs, and may further include a partial set of bits of a MAC subPDU, depending on the size of each subPDU and the capacity of each CBG 310.

FIG. 3A illustrates decoding configuration 300. Decoding configuration 300 may dictate that each MAC-CE 315 contained in MAC PDU 215-*a* be fully contained within a fixed set of CBGs 310. Decoding configuration 300 may require any MAC subPDUs containing a MAC-CE 315 be transmitted within the first two CBGs 310-*a* and 310-*b*. Because a receiving device knows the decoding configuration 300, the receiving device may anticipate receiving any MAC-CEs 315 within the first two CBGs 310-*a* and 310-*b* of MAC PDU 215-*a*. A receiving device may receive and decode each of the first four MAC subPDUs transmitted in CBGs 310-*a* and 310-*b*. Because the receiving device knows that no MAC-CEs 315 may be transmitted within the CBGs after CBG 310-*b*, the receiving device may begin L2 parsing as soon as CBG 310-*a* and 310-*b* are decoded and before the following CBGs 310 are decoded. Further, the receiving device may transmit an ACK message on a per-CBG basis (e.g., the receiving device may transmit an ACK feedback message relating to each CBG). In this example, the receiving device may transmit an ACK regarding CBGs 310-*a* and 310-*b* as soon as they have been successfully decoded. Such techniques may decrease a latency associated with activating the MAC-CE commands indicated in MAC-CEs 315-*a* and 315-*b*.

Although decoding configuration 300 demonstrates the fixed set of CBGs 310 occurring first within the MAC PDU 215-*a*, it will be appreciated by one skilled in the art that decoding configuration 300 may dictate that the fixed set of CBGs may be placed in other positions within MAC PDU 215-*a* (e.g., at the end of a MAC PDU 215-*a* transmission). For example, in uplink communications, a decoding configuration may dictate that any MAC subPDUs containing a MAC-CE 315 be transmitted within the last CBG 310-*c*.

FIG. 3B illustrates decoding configuration 301. Decoding configuration 301 may dictate a number and/or size of MAC-CEs 315 within MAC PDU 215-*b*. Additionally or alternatively, decoding configuration 301 may dictate the number and/or size of CBGs 310 carrying MAC-CEs 315. Decoding configuration 301 may limit a number of MAC-CEs 315 within MAC PDU 215-*b* to two. Receiving device may receive MAC-CE 315-*c* and MAC-CE 315-*d* within CBG 310-*d* and 310-*e* respectively. Once the receiving device decodes MAC-CE 315-*d*, the receiving device may determine MAC PDU 215-*b* does not contain further MAC-CEs 315 as the limit of two MAC-CEs within MAC PDU 215-*b* has been reached. In this example, the receiving device may begin L2 parsing after decoding MAC subPDU 3, which contains the second MAC-CE 315-*d*. In some cases, beginning L2 parsing prior to receiving the remaining CBGs (i.e., receiving through CBG 310-*f*) may decrease latency. Additionally, the receiving device may transmit an ACK regarding CBGs 310-*d* and 310-*e* as soon as they have been successfully decoded. This may decrease a latency associated with activating the MAC-CE commands indicated in MAC-CEs 315-*c* and 315-d.

Figure 4:
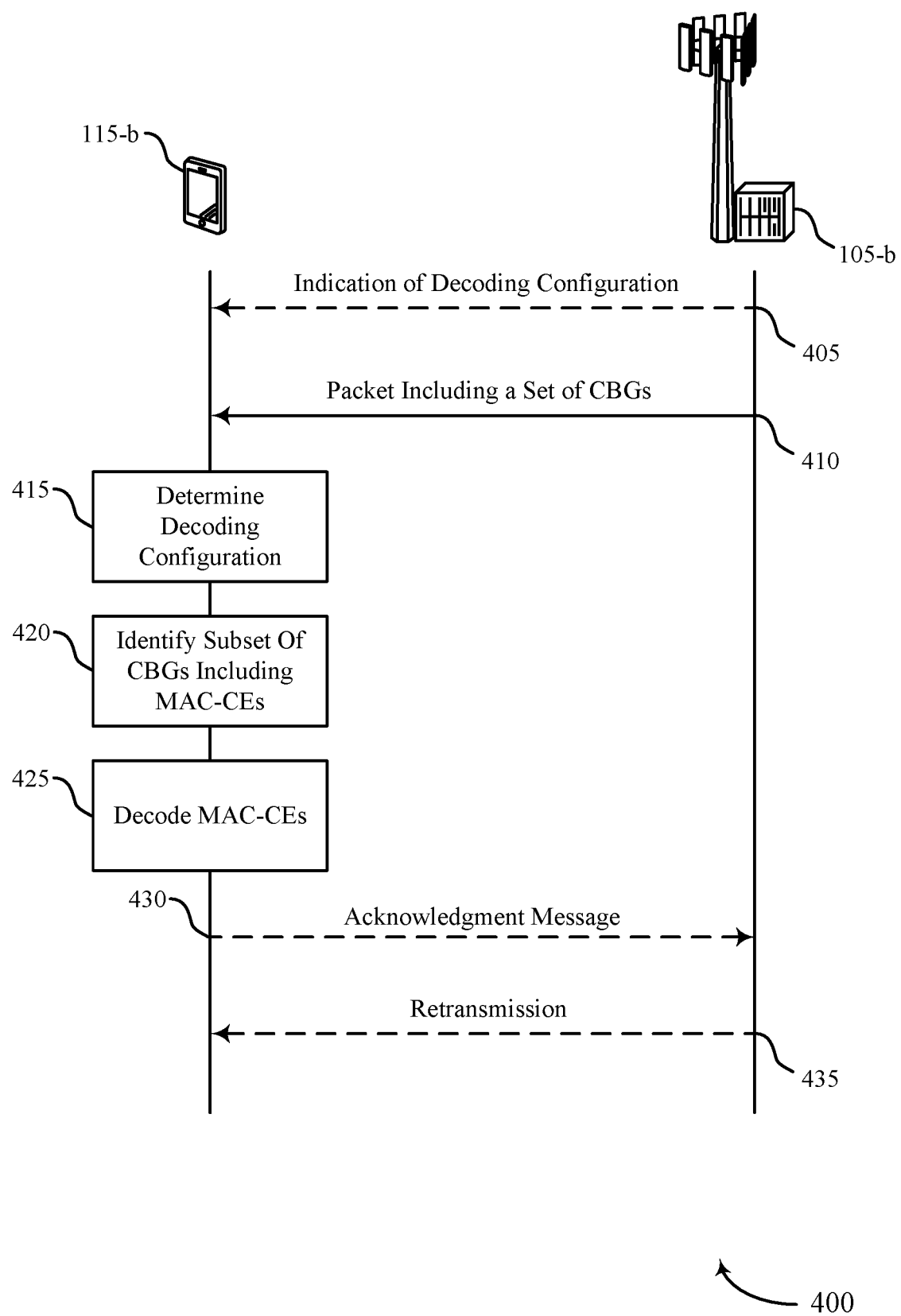
FIG. 4 illustrates an example of a process flow in a system that supports indicating MAC-CE information in accordance with aspects of the present disclosure.

FIG. 4 illustrates an example of a process flow 400 in a system that supports indicating MAC-CE information in accordance with aspects of the present disclosure. Process flow 400 may implement aspects of wireless communications system 100 and/or 200. Process flow 400 may include a base station 105-*b* and a UE 115-*b*, which may be examples of corresponding devices as described with reference to FIGS. 1-3. In the following description of the process flow 400, the operations between UE 115-*b* and base station 105-*b* may be performed in different orders or at different times. Operations may also be left out of the process flow 400, or other operations may be added to the process flow 400. It is to be understood that while UE 115-*b* and base station 105-*b* are shown performing a number of the operations of process flow 400, any wireless device may perform the operations shown.

At 405, base station 105-*b* may optionally transmit an indication of a decoding configuration. In some cases, the indication may be transmitted by base station 105-*b* a MIB, SIB, RRC message, a MAC-CE, a DCI message, or a combination thereof. In some examples, base station 105-*b* may transmit the indication via a temporally first DCI message, where the DCI message may have a first size that is different from a second DCI size of a second DCI message, a plurality of DCI messages, or a combination thereof.

At 410, UE 115-*b* may receive a packet including a set of CBGs from base station 105-*b*. The packet may include one or more MAC-CEs. In some cases, UE 115-*b* may receive a first MAC-CE indicating the decoding configuration. In some cases, UE 115-*b* may receive a first MAC-CE within a MAC subPDU that is concatenated first within the packet. The first MAC-CE may be the first temporally received MAC-CE of the packet. In some other cases, the first MAC-CE may be included in the first temporally received CBG of the packet. In some other cases, the first MAC-CE may be received within the temporally last CBG of the packet.

At 415, UE 115-*b* may determine a decoding configuration that indicates a subset of CBGs that includes one or more MAC-CEs, where each MAC-CE may be carried by a MAC subPDU within the packet. In some cases, UE 115-*b* may determine the decoding configuration based at least in part on the received indication of a decoding configuration at 405 or the first MAC-CE of 410. In some other cases, UE 115-*b* may determine the decoding configuration based at least in part on a size of the packet, a number of the set of CBGs, a maximum CB size, or a combination thereof. In some examples, the subset of MAC-CEs may include a fixed number of CBGs that includes one or more MAC-CEs. In another example, the decoding configuration may indicate a threshold number of MAC-CEs within the packet, or a threshold MAC-CE size within the packet, or an identification of a set of CBs or CBGs that enable decoding of a set of MAC-CEs within the CBs or CBGs, or a combination thereof.

As an example, the decoding configuration may include a fixed set of CBGs which contain all of the MAC-CEs within the MAC PDU packet or the MAC-CEs of a particular type (e.g., a type of functionality of a MAC-CE, such as beam switching, SPS activation, SPS deactivation, etc.). In such cases, instead of indicating a fixed set of CBGs containing certain MAC-CEs, the configuration may include a first set of CBGs whose decoding allows identification and decoding of MAC-CEs. These MAC-CEs may be different from the CBGs in the first set. For example, the CBGs may be included in the CBGs of a second set, which may either be a subset of the first set or may contain other CBGs not in the first set. In some examples, the CBGs of the second set may be identified by decoding the CBGs in the first set. In such cases, the identification may include reading other MAC-CEs or subPDUs from the decoded CBGs in the first set. Here, base station 105-*b* may determine that UE 115-*b* has decoded the MAC-CEs if UE 115-*b* transmits ACKs for all the CBGs in both the first set and the second set. In some examples, the second set may not enable decoding of the MAC-CEs, but may, in turn, identify a third set of CBGs that may enable completing the decoding of the MAC-CEs. In another example, the configuration may specify a limit on the number and/or size of the MAC-CEs within each MAC PDU packet, which may in turn identify a fixed set of CBGs (e.g., the first set of CBGs).

At 420, UE 115-*b* may identify the subset of CBGs that includes one or more MAC-CEs based on the determined decoding configuration of 415. In some instances, the subset of CBGs based on the determined decoding configuration may be based on a determined communication scheme (e.g., URLLC, eMBB), where the communication scheme may be determined based at least in part on a DCI message or an RNTI. In some cases, UE 115-*b* may further identify that the first MAC-CE of 410 is included in each CBG of the identified subset of 415. In some other cases, UE 115-*b* may identify the first MAC-CE of 410 as being included in the first temporal CB of each CBG indicated in the subset identified at 415.

At 425, UE 115-*b* may decode the one or more MAC-CEs within the respective MAC subPDUs based at least in part on identifying the subset of CBGs. At 430, UE 115-*b* may transmit an acknowledgment message based on decoding at least one CBG of the subset of CBGs which includes the one or more MAC-CEs.

At 435, base station 105-*b* may optionally retransmit at least a portion of the packet transmitted at 405. In some cases, the retransmission may include the subset of CBGs that excludes the first MAC-CE based at least in part on decoding a CB that includes the first MAC-CE or decoding a CBG that includes the first MAC-CE. In some other cases, the retransmission may include one or more CBGs of the subset of CBGs that excludes the first MAC-CE based at least in part on a presence of a flush-indicator set within the subset of CBGs. In some cases, UE 115-*b* may determine a second subset of CBGs within the retransmission that includes the one or more MAC-CEs based at least in part on the identified decoding configuration.

Figure 5:
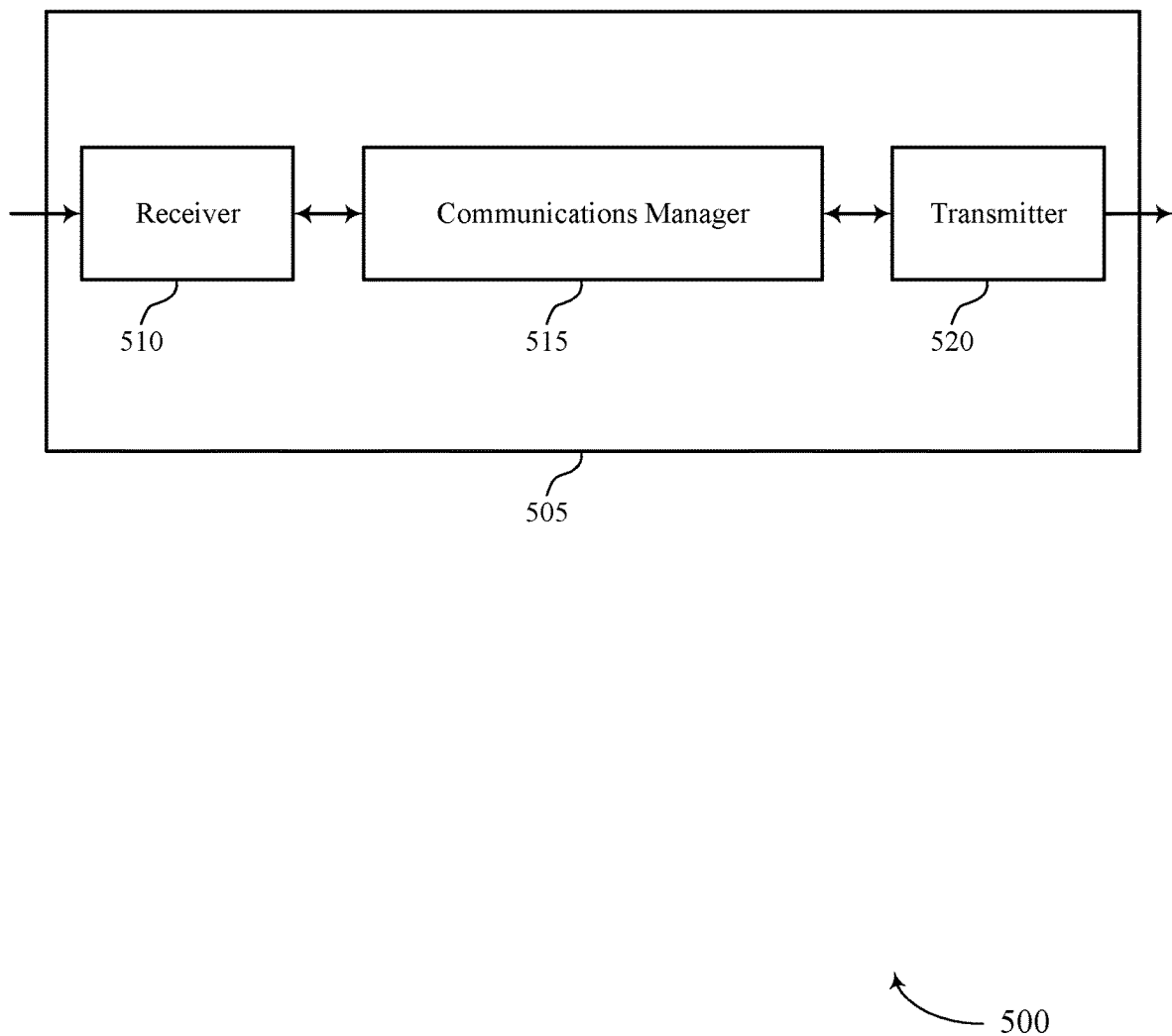
FIGS. 5 and 6 show block diagrams of devices that support indicating MAC-CE information in accordance with aspects of the present disclosure.

FIG. 5 shows a block diagram 500 of a device 505 that supports indicating MAC-CE information in accordance with aspects of the present disclosure. The device 505 may be an example of aspects of a UE 115 or base station 105 as described herein. The device 505 may include a receiver 510, a communications manager 515, and a transmitter 520. The device 505 may also include a processor. Each of these components may be in communication with one another (e.g., via one or more buses).

Receiver 510 may receive information such as packets, user data, or control information associated with various information channels (e.g., control channels, data channels, and information related to indicating MAC-CE information, etc.). Information may be passed on to other components of the device 505. The receiver 510 may be an example of aspects of the transceiver 820 or 920 as described with reference to FIGS. 8 and 9. The receiver 510 may utilize a single antenna or a set of antennas.

The communications manager 515 may receive, from a wireless device, a packet including a set of CBGs and determine, for the set of CBGs, a decoding configuration that indicates a subset of CBGs which includes one or more MAC-CEs, each MAC-CE being carried by respective MAC subPDUs within the packet. Additionally or alternatively, the communications manager 515 may determine for the set of CBGs, a decoding configuration that indicates a subset of CBGs which includes one or more MAC subPDUs within the packet. In some examples, the communications manager 515 may identify the subset of CBGs based on the determined decoding configuration and decode the one or more MAC-CEs within the respective MAC subPDUs based on identifying the subset of CBGs. In some examples, the communications manager 515 may decode content of the one or more MAC subPDUs based at least in part on identifying the subset of CBGs. The communications manager 515 may be an example of aspects of the communications manager 810 or 910 as described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 520 may transmit signals generated by other components of the device 505. In some examples, the transmitter 520 may be collocated with a receiver 510 in a transceiver module. For example, the transmitter 520 may be an example of aspects of the transceiver 820 or 920 as described with reference to FIGS. 8 and 9. The transmitter 520 may utilize a single antenna or a set of antennas.

Figure 6:
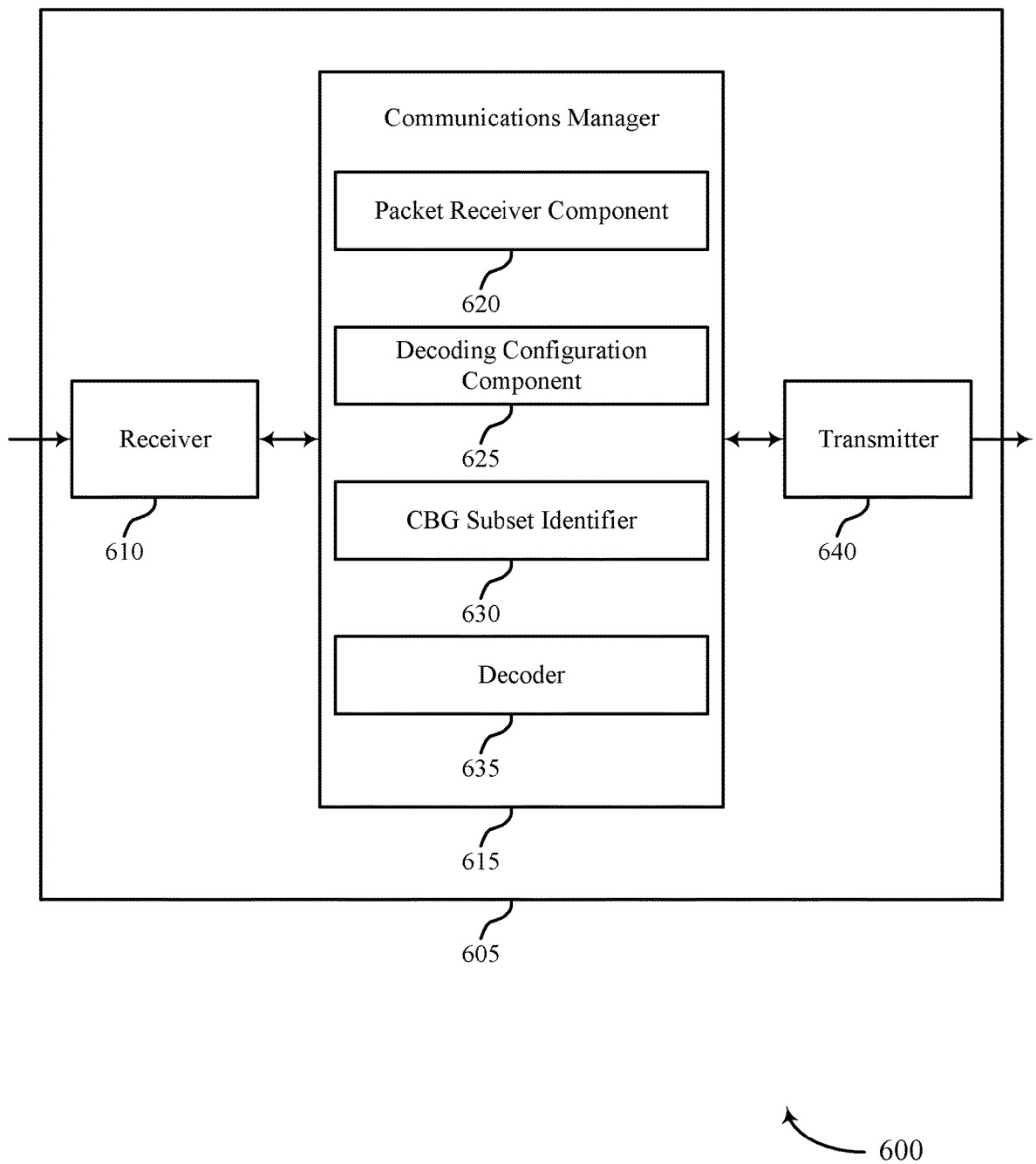

FIG. 6 shows a block diagram 600 of a device 605 that supports indicating MAC-CE information in accordance with aspects of the present disclosure. The device 605 may be an example of aspects of a device 505, a UE 115, or a base station 105 as described herein. The device 605 may include a receiver 610, a communications manager 615, and a transmitter 640. The device 605 may also include a processor. Each of these components may be in communication with one another (e.g., via one or more buses).

Receiver 610 may receive information such as packets, user data, or control information associated with various information channels (e.g., control channels, data channels, and information related to indicating MAC-CE information, etc.). Information may be passed on to other components of the device 605. The receiver 610 may be an example of aspects of the transceiver 820 or 920 as described with reference to FIGS. 8 and 9. The receiver 610 may utilize a single antenna or a set of antennas.

The communications manager 615 may be an example of aspects of the communications manager 515 as described herein. The communications manager 615 may include a packet receiver component 620, a decoding configuration component 625, a CBG subset identifier 630, and a decoder 635. The communications manager 615 may be an example of aspects of the communications manager 810 or 910 as described herein.

The packet receiver component 620 may receive, from a wireless device, a packet including a set of CBGs. The decoding configuration component 625 may determine, for the set of CBGs, a decoding configuration that indicates a subset of CBGs which includes one or more MAC-CEs, each MAC-CE being carried by respective MAC subPDUs within the packet. The CBG subset identifier 630 may identify the subset of CBGs based on the determined decoding configuration. The decoder 635 may decode the one or more MAC-CEs within the respective MAC subPDUs based on identifying the subset of CBGs. In some cases, decoding the content of the one or more MAC subPDUs may include decoding one or more MAC-CEs carried by respective MAC subPDUs of the one or more MAC subPDUs. Additionally or alternatively, decoding the content of the one or more MAC subPDUs may include decoding one or more MAC SDUs carried by respective MAC subPDUs of the one or more MAC subPDUs.

Transmitter 640 may transmit signals generated by other components of the device 605. In some examples, the transmitter 640 may be collocated with a receiver 610 in a transceiver module. For example, the transmitter 640 may be an example of aspects of the transceiver 820 or 920 as described with reference to FIGS. 8 and 9. The transmitter 640 may utilize a single antenna or a set of antennas.

Figure 7:
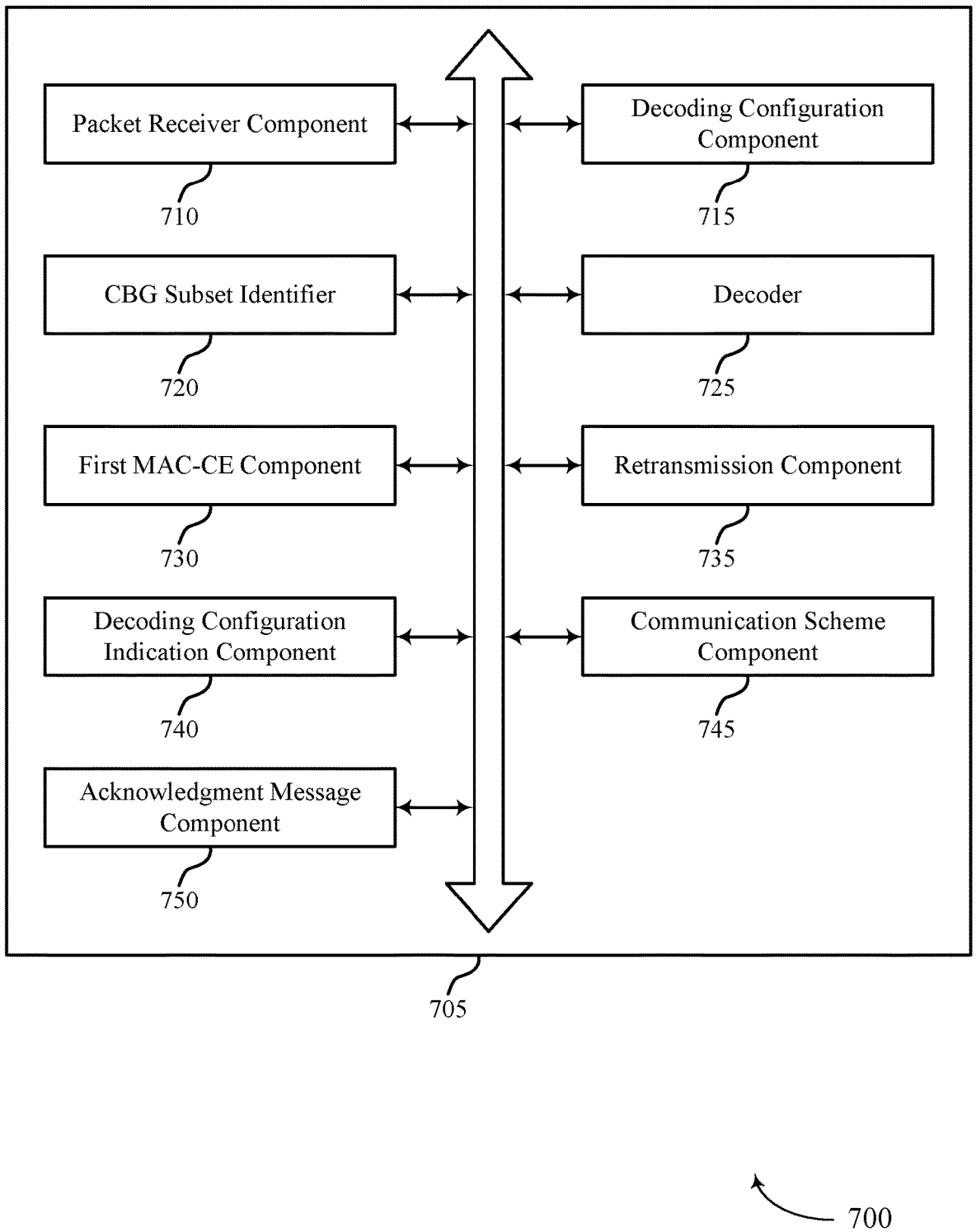
FIG. 7 shows a block diagram of a communications manager that supports indicating MAC-CE information in accordance with aspects of the present disclosure.

FIG. 7 shows a block diagram 700 of a communications manager 705 that supports indicating MAC-CE information in accordance with aspects of the present disclosure. The communications manager 705 may be an example of aspects of a communications manager 515, a communications manager 615, or a communications manager 810 described herein. The communications manager 705 may include a packet receiver component 710, a decoding configuration component 715, a CBG subset identifier 720, a decoder 725, a first MAC-CE component 730, a retransmission component 735, a decoding configuration indication component 740, a communication scheme component 745, and an acknowledgment message component 750. Each of these modules may communicate, directly or indirectly, with one another (e.g., via one or more buses).

The packet receiver component 710 may receive, from a wireless device, a packet including a set of CBGs. The decoding configuration component 715 may determine, for the set of CBGs, a decoding configuration that indicates a subset of CBGs which includes one or more MAC-CEs, each MAC-CE being carried by respective MAC subPDUs within the packet. In some cases, the decoding configuration component 715 may determine, for the set of CBGs, a decoding configuration that indicates a subset of CBGs which includes one or more MAC subPDUs within the packet. In some examples, the decoding configuration component 715 may determine the decoding configuration based on a size of the packet, a number of the set of CBGs, a maximum CB size, or a combination thereof. In some cases, the decoding configuration component 715 may apply the decoding configuration based on the determined communication scheme. In some aspects, the decoding configuration indicates a threshold number of MAC-CEs within the packet, or a threshold MAC-CE size within the packet, or an identification of a set of CBs or CBGs that, when decoded, allows decoding of an identified set of MAC-CEs within the CBs or CBGs, or a combination thereof. In some cases, the decoding configuration applies to a respective MAC-CE of the one or more MAC-CEs. Additionally or alternatively, the decoding configuration may apply to a respective MAC subPDU of the one or more MAC subPDUs. In some instances, the decoding configuration applies to each MAC-CE of the one or more MAC-CEs. In some instances, the decoding configuration applies to each MAC subPDU of the one or more MAC subPDUs.

The CBG subset identifier 720 may identify the subset of CBGs based on the determined decoding configuration. In some examples, the CBG subset identifier 720 may determine a second subset of CBGs within the retransmission that include the one or more MAC-CEs and/or MAC subPDUs based on the decoding configuration. In some cases, the subset of CBGs includes a fixed number of CBGs that include the one or more MAC-CEs.

The decoder 725 may decode the one or more MAC-CEs within the respective MAC subPDUs based on identifying the subset of CBGs. In some examples, the decoder 725 may identify, within the subset of CBGs, respective code blocks (CBs) that include a MAC-CE based on a set of bits appended to each of the respective CBs, where decoding the one or more MAC-CEs is based on identifying the respective CBs.

The first MAC-CE component 730 may receive a first MAC-CE of the one or more MAC-CEs that indicates the decoding configuration, where determining the decoding configuration is based on decoding the first MAC-CE. In some examples, the first MAC-CE component 730 may identify the first MAC-CE as being carried by a MAC subPDU that is first in a subPDU concatenation within the packet. In some instances, the first MAC-CE component 730 may identify the first MAC-CE as a temporally first MAC-CE within the packet. In some cases, the first MAC-CE component 730 may identify the first MAC-CE as being included in a temporally first CBG of the set of CBGs. In some examples, the first MAC-CE component 730 may identify the first MAC-CE as being included in a temporally last CBG of the set of CBGs. In some instances, the first MAC-CE component 730 may identify the first MAC-CE as being included in each CBG of the subset of CBGs or as being included in a temporally first CB within each CBG of the subset of CBGs.

The retransmission component 735 may receive a retransmission of the subset of CBGs that excludes the first MAC-CE based on decoding a CB that includes the first MAC-CE or decoding a CBG that includes the first MAC-CE. In some examples, the retransmission component 735 may receive a retransmission of one or more CBGs of the subset of CBGs that exclude the first MAC-CE based on a presence of a flush-indicator set within the subset of CBGs. In some cases, the retransmission component 735 may receive a retransmission of the packet.

The decoding configuration indication component 740 may receive, from the wireless device, an indication of the decoding configuration, where determining the decoding configuration is based on the received indication. In some examples, the decoding configuration indication component 740 may receive an indication of the decoding configuration via a temporally first DCI message, a DCI message having a first DCI size that is different from a second DCI size of a second DCI message, a set of DCI messages, or a combination thereof. In some cases, the indication is received via a MIB, a SIB, an RRC message, a MAC-CE, a DCI message, or a combination thereof.

The communication scheme component 745 may determine a communication scheme based on at least one of a DCI message or an RNTI. In some cases, the communication scheme includes URLLC, eMBB, or a combination thereof.

The acknowledgment message component 750 may transmit an acknowledgment based on decoding at least one CBG of the subset of CBGs which includes the one or more MAC-CEs. Additionally or alternatively, the acknowledgment message component 750 may transmitting the acknowledgment based on decoding at least one CBG of the subset of CBGs which includes the one or more MAC subPDUs.

Figure 8:
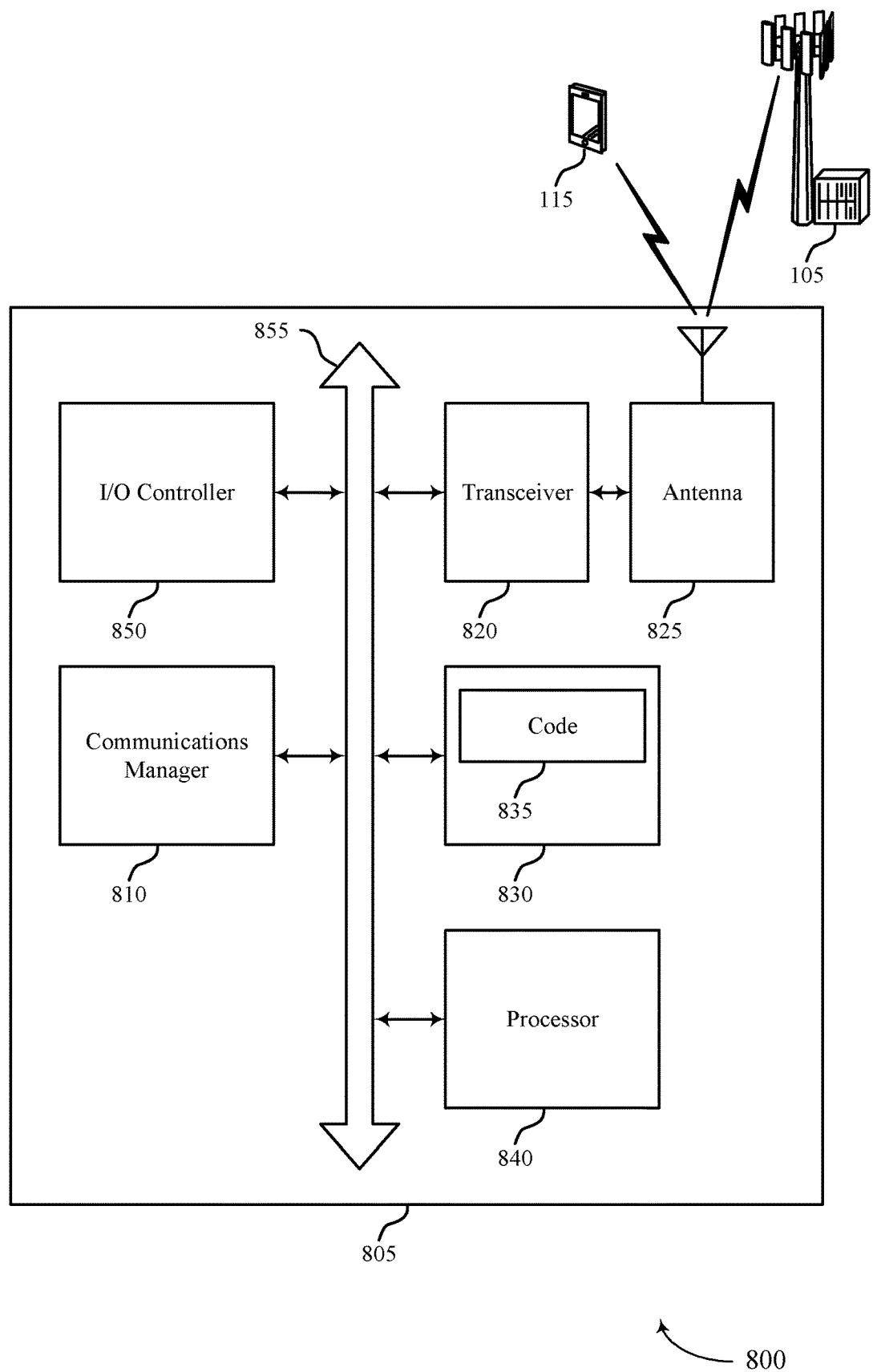
FIG. 8 shows a diagram of a system including a user equipment (UE) that supports indicating MAC-CE information in accordance with aspects of the present disclosure.

FIG. 8 shows a diagram of a system 800 including a device 805 that supports indicating MAC-CE information in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, a transceiver 820, an antenna 825, memory 830, a processor 840, and an I/O controller 850. These components may be in electronic communication via one or more buses (e.g., bus 855).

The communications manager 810 may receive, from a wireless device, a packet including a set of CBGs. In some examples, the communications manager 810 may further determine, for the set of CBGs, a decoding configuration that indicates a subset of CBGs which includes one or more MAC-CEs, each MAC-CE being carried by respective MAC subPDUs within the packet. In some cases, the communications manager 810 may identify the subset of CBGs based on the determined decoding configuration, and decode the one or more MAC-CEs within the respective MAC subPDUs based on identifying the subset of CBGs.

Transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the wireless device may include a single antenna 825. However, in some cases the device may have more than one antenna 825, which may be capable of concurrently transmitting or receiving multiple wireless transmissions.

The memory 830 may include RAM, ROM, or a combination thereof. The memory 830 may store computer-readable code 835 including instructions that, when executed by a processor (e.g., the processor 840) cause the device to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting indicating MAC-CE information).

The I/O controller 850 may manage input and output signals for the device 805. The I/O controller 850 may also manage peripherals not integrated into the device 805. In some cases, the I/O controller 850 may represent a physical connection or port to an external peripheral. In some cases, the I/O controller 850 may utilize an operating system such as iOS®, ANDROID®, MS-DOS®, MS-WINDOWS®, OS/2®, UNIX®, LINUX®, or another known operating system. In other cases, the I/O controller 850 may represent or interact with a modem, a keyboard, a mouse, a touchscreen, or a similar device. In some cases, the I/O controller 850 may be implemented as part of a processor. In some cases, a user may interact with the device 805 via the I/O controller 850 or via hardware components controlled by the I/O controller 850.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
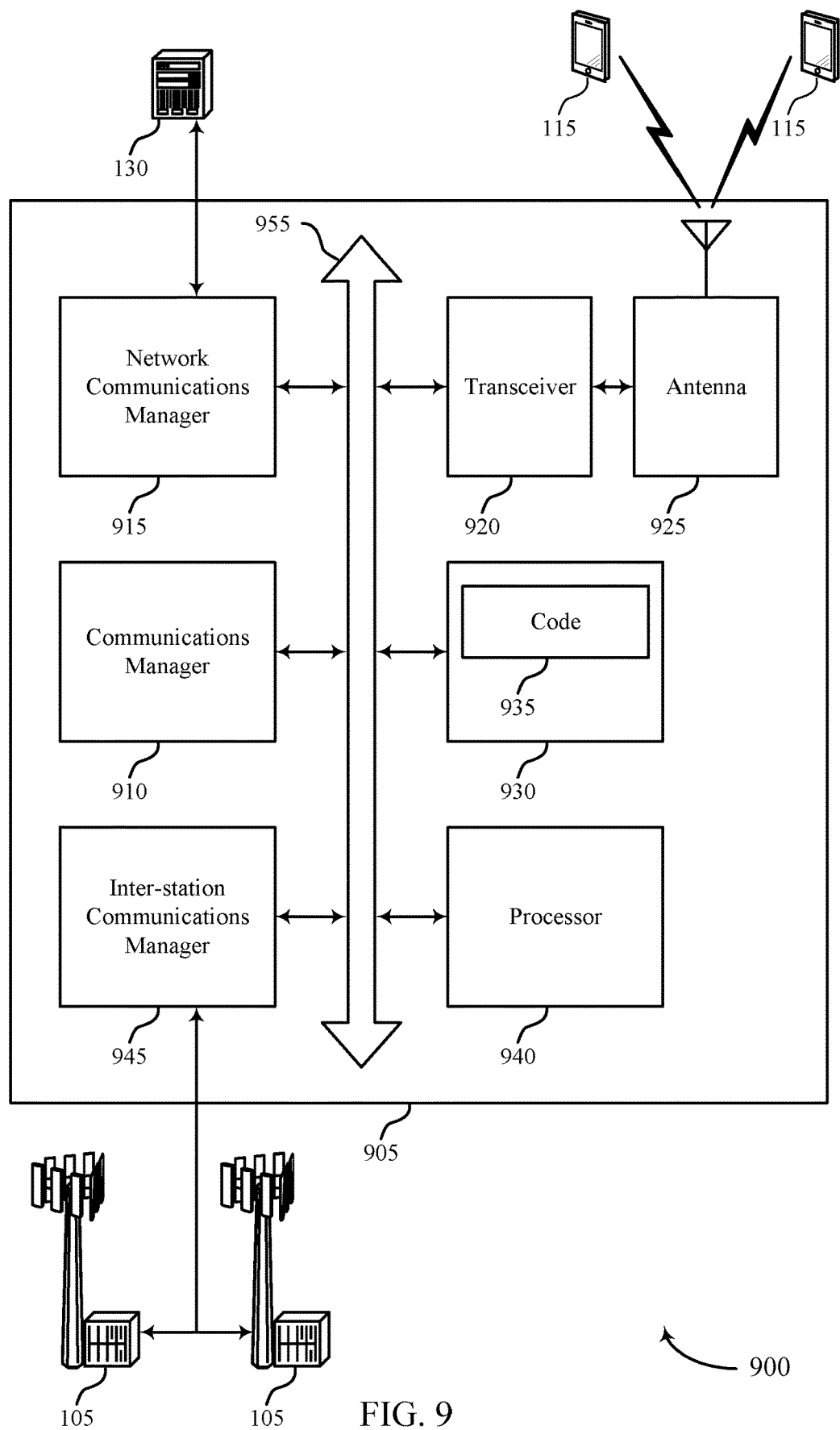
FIG. 9 shows a diagram of a system including a base station that supports indicating MAC-CE information in accordance with aspects of the present disclosure.

FIG. 9 shows a diagram of a system 900 including a device 905 that supports indicating MAC-CE information in accordance with aspects of the present disclosure. The device 905 may be an example of or include the components of device 505, device 605, or a base station 105 as described herein. The device 905 may include components for bi-directional voice and data communications including components for transmitting and receiving communications, including a communications manager 910, a network communications manager 915, a transceiver 920, an antenna 925, memory 930, a processor 940, and an inter-station communications manager 945. These components may be in electronic communication via one or more buses (e.g., bus 955).

The communications manager 910 may receive, from a wireless device, a packet including a set of CBGs. In some cases, the communications manager 910 may determine, for the set of CBGs, a decoding configuration that indicates a subset of CBGs which includes one or more MAC-CEs, each MAC-CE being carried by respective MAC subPDUs within the packet. In some instances, the communications manager 910 may identify the subset of CBGs based on the determined decoding configuration, and decode the one or more MAC-CEs within the respective MAC subPDUs based on identifying the subset of CBGs.

Network communications manager 915 may manage communications with the core network (e.g., via one or more wired backhaul links). For example, the network communications manager 915 may manage the transfer of data communications for client devices, such as one or more UEs 115.

Transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases, the device may have more than one antenna 925, which may be capable of concurrently transmitting or receiving multiple wireless transmissions.

The memory 930 may include RAM, ROM, or a combination thereof. The memory 930 may store computer-readable code 935 including instructions that, when executed by a processor (e.g., the processor 940) cause the device to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting indicating MAC-CE information).

Inter-station communications manager 945 may manage communications with other base station 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, inter-station communications manager 945 may provide an X2 interface within an LTE/LTE-A wireless communication network technology to provide communication between base stations 105.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
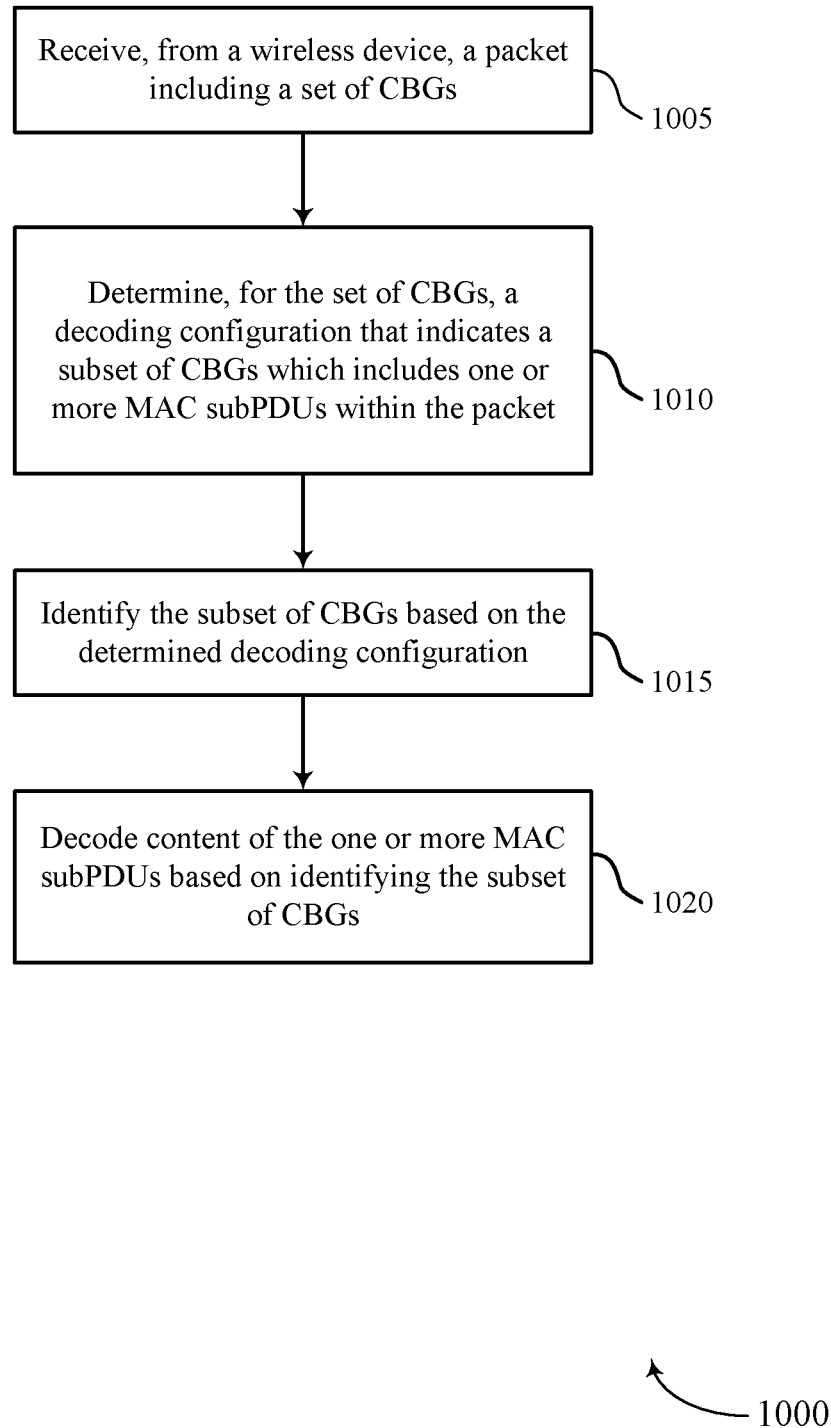
FIGS. 10 through 12 show flowcharts illustrating methods that support indicating MAC-CE information in accordance with aspects of the present disclosure.

FIG. 10 shows a flowchart illustrating a method 1000 that supports indicating MAC-CE information in accordance with aspects of the present disclosure. The operations of method 1000 may be implemented by a wireless device, such as a UE 115 or base station 105, or its components as described herein. For example, the operations of method 1000 may be performed by a communications manager as described with reference to FIGS. 5 through 9. In some examples, a UE 115 or base station 105 may execute a set of instructions to control the functional elements of the UE 115 or base station 105 to perform the functions described herein. Additionally or alternatively, a UE 115 or base station 105 may perform aspects of the functions described herein using special-purpose hardware.

At 1005, the UE 115 or base station 105 may receive, from a wireless device, a packet including a set of CBGs. The operations of 1005 may be performed according to the methods described herein. In some examples, aspects of the operations of 1005 may be performed by a packet receiver component as described with reference to FIGS. 5 through 9. Additionally or alternatively, means for performing 1005 may, but not necessarily, include, for example, antenna 825, transceiver 820, communications manager 810, memory 830 (including code 835), processor 840, and/or bus 855 with reference to FIG. 8 or antenna 925, transceiver 920, communications manager 915, memory 930 (including code 935), processor 940 and/or bus 955 with reference to FIG. 9.

At 1010, the UE 115 or base station 105 may determine, for the set of CBGs, a decoding configuration that indicates a subset of CBGs which includes one or more MAC subPDUs within the packet. The operations of 1010 may be performed according to the methods described herein. In some examples, aspects of the operations of 1010 may be performed by a decoding configuration component as described with reference to FIGS. 5 through 9. Additionally or alternatively, means for performing 1010 may, but not necessarily, include, for example, transceiver 820, communications manager 810, memory 830 (including code 835), processor 840, and/or bus 855 with reference to FIG. 8 or transceiver 920, communications manager 915, memory 930 (including code 935), processor 940 and/or bus 955 with reference to FIG. 9.

At 1015, the UE 115 or base station 105 may identify the subset of CBGs based on the determined decoding configuration. The operations of 1015 may be performed according to the methods described herein. In some examples, aspects of the operations of 1015 may be performed by a CBG subset identifier as described with reference to FIGS. 5 through 9. Additionally or alternatively, means for performing 1015 may, but not necessarily, include, for example, transceiver 820, communications manager 810, memory 830 (including code 835), processor 840, and/or bus 855 with reference to FIG. 8 or transceiver 920, communications manager 915, memory 930 (including code 935), processor 940 and/or bus 955 with reference to FIG. 9.

At 1020, the UE 115 or base station 105 may decode content of the one or more MAC subPDUs based on identifying the subset of CBGs. The operations of 1020 may be performed according to the methods described herein. In some examples, aspects of the operations of 1020 may be performed by a decoder as described with reference to FIGS. 5 through 9. Additionally or alternatively, means for performing 1020 may, but not necessarily, include, for example, transceiver 820, communications manager 810, memory 830 (including code 835), processor 840, and/or bus 855 with reference to FIG. 8 or transceiver 920, communications manager 915, memory 930 (including code 935), processor 940 and/or bus 955 with reference to FIG. 9.

Figure 11:
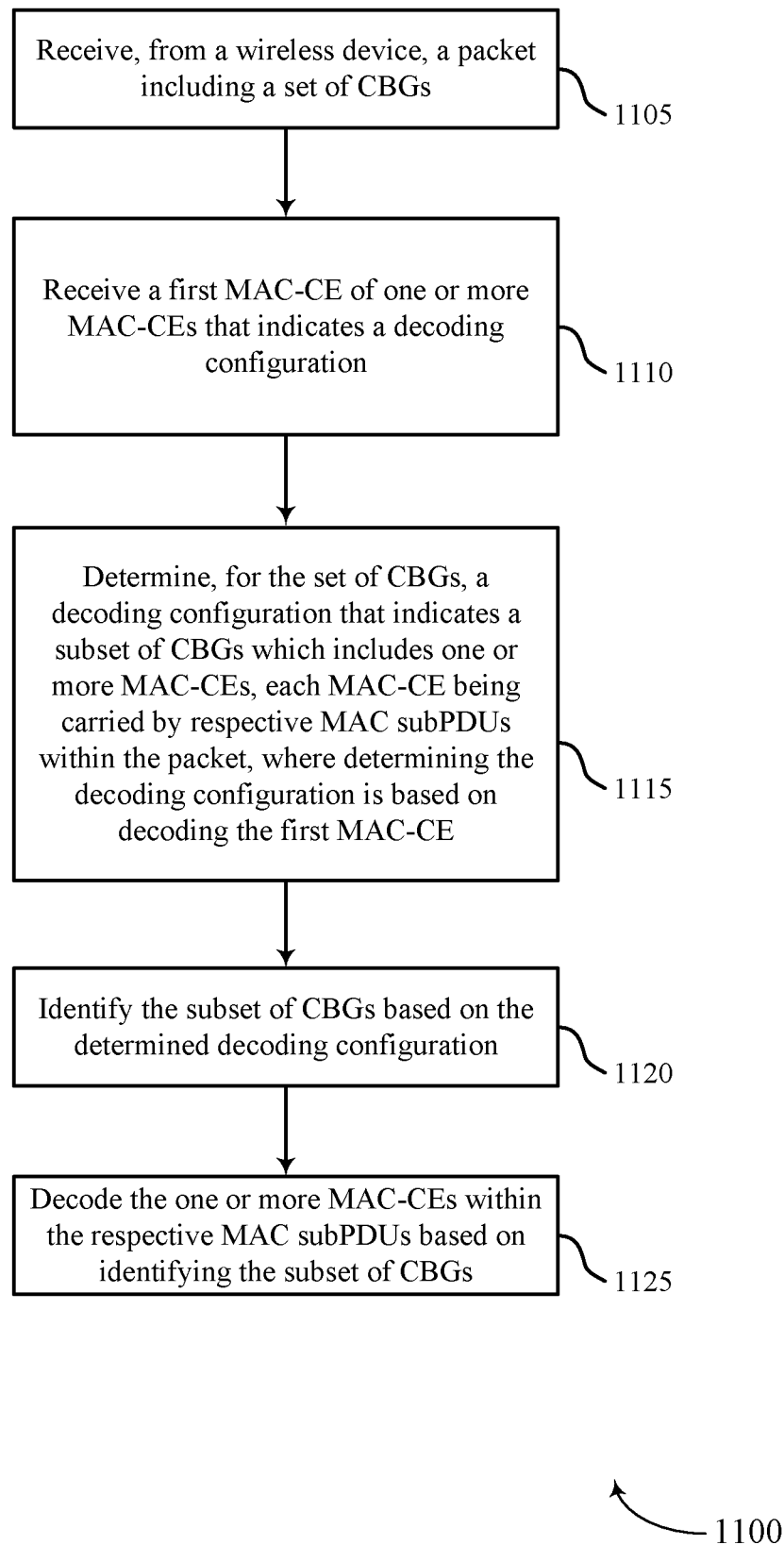

FIG. 11 shows a flowchart illustrating a method 1100 that supports indicating MAC-CE information in accordance with aspects of the present disclosure. The operations of method 1100 may be implemented by a wireless device, such as a UE 115 or base station 105, or its components as described herein. For example, the operations of method 1100 may be performed by a communications manager as described with reference to FIGS. 5 through 9. In some examples, a UE 115 or base station 105 may execute a set of instructions to control the functional elements of the UE 115 or base station 105 to perform the functions described herein. Additionally or alternatively, a UE 115 or base station 105 may perform aspects of the functions described herein using special-purpose hardware.

At 1105, the UE 115 or base station 105 may receive, from a wireless device, a packet including a set of CBGs. The operations of 1105 may be performed according to the methods described herein. In some examples, aspects of the operations of 1105 may be performed by a packet receiver component as described with reference to FIGS. 5 through 9.

At 1110, the UE 115 or base station 105 may receive a first MAC-CE of the one or more MAC-CEs that indicates the decoding configuration, where determining the decoding configuration is based on decoding the first MAC-CE. The operations of 1110 may be performed according to the methods described herein. In some examples, aspects of the operations of 1110 may be performed by a first MAC-CE component as described with reference to FIGS. 5 through 9. Additionally or alternatively, means for performing 1105 and/or 1110 may, but not necessarily, include, for example, antenna 825, transceiver 820, communications manager 810, memory 830 (including code 835), processor 840, and/or bus 855 with reference to FIG. 8 or antenna 925, transceiver 920, communications manager 915, memory 930 (including code 935), processor 940 and/or bus 955 with reference to FIG. 9.

At 1115, the UE 115 or base station 105 may determine, for the set of CBGs, a decoding configuration that indicates a subset of CBGs which includes one or more MAC-CEs, each MAC-CE being carried by respective MAC subPDUs within the packet. The operations of 1115 may be performed according to the methods described herein. In some examples, aspects of the operations of 1115 may be performed by a decoding configuration component as described with reference to FIGS. 5 through 9. Additionally or alternatively, means for performing 1115 may, but not necessarily, include, for example, transceiver 820, communications manager 810, memory 830 (including code 835), processor 840, and/or bus 855 with reference to FIG. 8 or transceiver 920, communications manager 915, memory 930 (including code 935), processor 940 and/or bus 955 with reference to FIG. 9.

At 1120, the UE 115 or base station 105 may identify the subset of CBGs based on the determined decoding configuration. The operations of 1120 may be performed according to the methods described herein. In some examples, aspects of the operations of 1120 may be performed by a CBG subset identifier as described with reference to FIGS. 5 through 9. Additionally or alternatively, means for performing 1120 may, but not necessarily, include, for example, transceiver 820, communications manager 810, memory 830 (including code 835), processor 840, and/or bus 855 with reference to FIG. 8 or transceiver 920, communications manager 915, memory 930 (including code 935), processor 940 and/or bus 955 with reference to FIG. 9.

At 1125, the UE 115 or base station 105 may decode the one or more MAC-CEs within the respective MAC subPDUs based on identifying the subset of CBGs. The operations of 1125 may be performed according to the methods described herein. In some examples, aspects of the operations of 1125 may be performed by a decoder as described with reference to FIGS. 5 through 9. Additionally or alternatively, means for performing 1125 may, but not necessarily, include, for example, transceiver 820, communications manager 810, memory 830 (including code 835), processor 840, and/or bus 855 with reference to FIG. 8 or transceiver 920, communications manager 915, memory 930 (including code 935), processor 940 and/or bus 955 with reference to FIG. 9.

Figure 12:
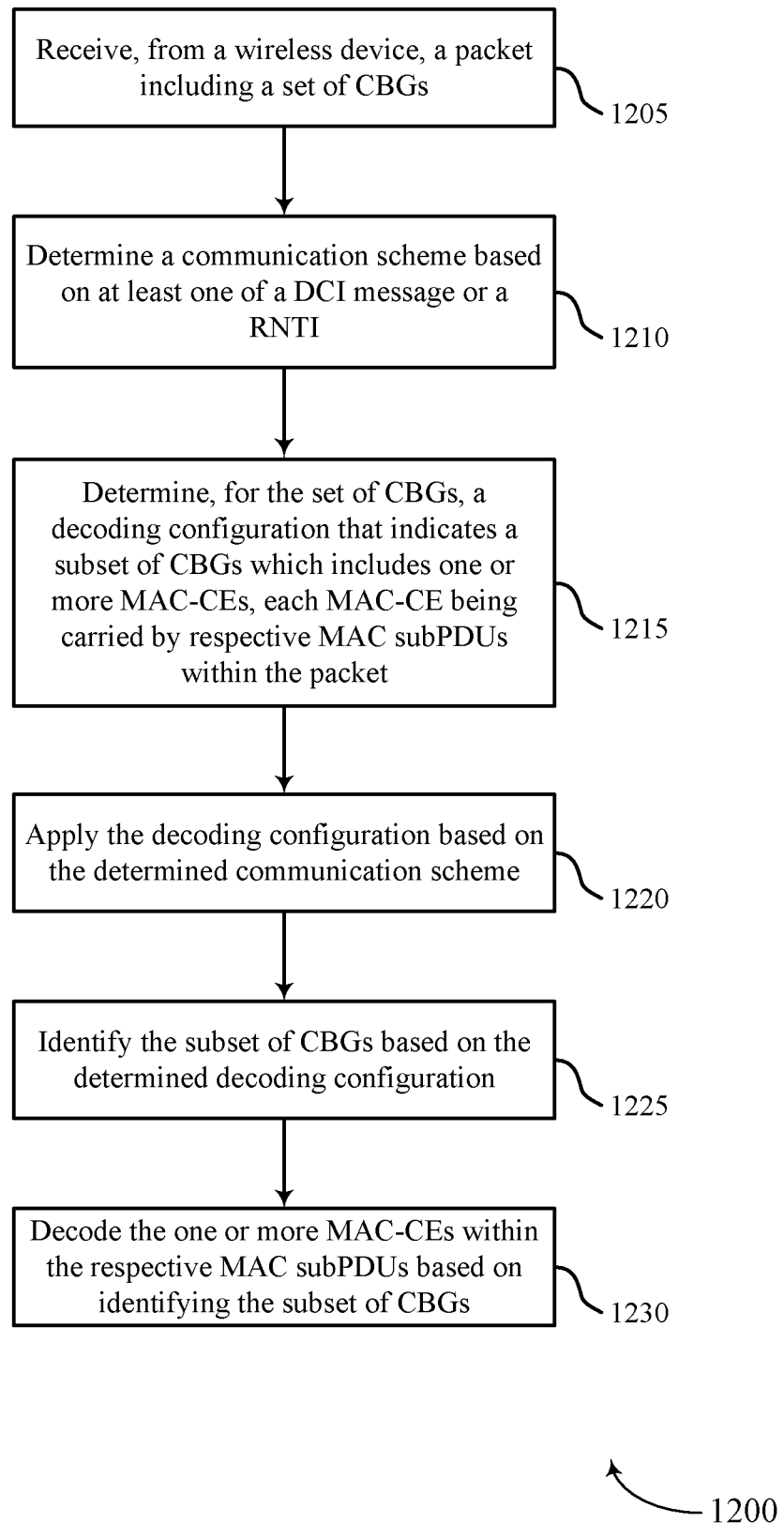

FIG. 12 shows a flowchart illustrating a method 1200 that supports indicating MAC-CE information in accordance with aspects of the present disclosure. The operations of method 1200 may be implemented by a wireless device, such as a UE 115 or base station 105, or its components as described herein. For example, the operations of method 1200 may be performed by a communications manager as described with reference to FIGS. 5 through 9. In some examples, a UE 115 or base station 105 may execute a set of instructions to control the functional elements of the UE 115 or base station 105 to perform the functions described herein. Additionally or alternatively, a UE 115 or base station 105 may perform aspects of the functions described herein using special-purpose hardware.

At 1205, the UE 115 or base station 105 may receive, from a wireless device, a packet including a set of CBGs. The operations of 1205 may be performed according to the methods described herein. In some examples, aspects of the operations of 1205 may be performed by a packet receiver component as described with reference to FIGS. 5 through 9. Additionally or alternatively, means for performing 1205 may, but not necessarily, include, for example, antenna 825, transceiver 820, communications manager 810, memory 830 (including code 835), processor 840, and/or bus 855 with reference to FIG. 8 or antenna 925, transceiver 920, communications manager 915, memory 930 (including code 935), processor 940 and/or bus 955 with reference to FIG. 9.

At 1210, the UE 115 or base station 105 may determine a communication scheme based on at least one of a DCI message or a radio network temporary identifier (RNTI). The operations of 1210 may be performed according to the methods described herein. In some examples, aspects of the operations of 1210 may be performed by a communication scheme component as described with reference to FIGS. 5 through 9.

At 1215, the UE 115 or base station 105 may determine, for the set of CBGs, a decoding configuration that indicates a subset of CBGs which includes one or more MAC-CEs, each MAC-CE being carried by respective MAC subPDUs within the packet. The operations of 1215 may be performed according to the methods described herein. In some examples, aspects of the operations of 1215 may be performed by a decoding configuration component as described with reference to FIGS. 5 through 9.

At 1220, the UE 115 or base station 105 may apply the decoding configuration based on the determined communication scheme. The operations of 1220 may be performed according to the methods described herein. In some examples, aspects of the operations of 1220 may be performed by a decoding configuration component as described with reference to FIGS. 5 through 9.

At 1225, the UE 115 or base station 105 may identify the subset of CBGs based on the determined decoding configuration. The operations of 1225 may be performed according to the methods described herein. In some examples, aspects of the operations of 1225 may be performed by a CBG subset identifier as described with reference to FIGS. 5 through 9.

At 1230, the UE 115 or base station 105 may decode the one or more MAC-CEs within the respective MAC subPDUs based on identifying the subset of CBGs. The operations of 1230 may be performed according to the methods described herein. In some examples, aspects of the operations of 1230 may be performed by a decoder as described with reference to FIGS. 5 through 9. Additionally or alternatively, means for performing 1210, 1215, 1220, 1225, and/or 1230 may, but not necessarily, include, for example, transceiver 820, communications manager 810, memory 830 (including code 835), processor 840, and/or bus 855 with reference to FIG. 8 or transceiver 920, communications manager 915, memory 930 (including code 935), processor 940 and/or bus 955 with reference to FIG. 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a FPGA, or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, from a wireless device, a medium access control (MAC) protocol data units (PDU) packet comprising a set of code block groups (CBGs);
   receiving a first MAC-control element (MAC-CE) that indicates a decoding configuration of the set of CBGs, the decoding configuration indicating which CBGs of a subset of CBGs include one or more MAC sub-protocol data units (subPDUs), wherein the MAC PDU packet comprises a number of MAC subPDUs that include one or more MAC-CEs of a number of MAC-CEs within the MAC PDU packet, and wherein the decoding configuration comprises one or more rules for decoding the indicated CBGs that include the one or more MAC subPDUs, the one or more rules comprising a limit on the number of MAC-CEs within the MAC PDU packet, a size limit of each MAC-CE of the number of MAC-CEs within the MAC PDU packet, or a combination thereof; and
decoding content of the one or more MAC subPDUs based at least in part on the indicated CBGs of the subset of CBGs and the one or more rules.

2. The method of claim 1, wherein decoding the content of the one or more MAC subPDUs comprises:
decoding the one or more MAC-CEs included in respective MAC subPDUs of the one or more MAC subPDUs.

3. The method of claim 1, further comprising:
determining the decoding configuration based at least in part on decoding the first MAC-CE.

4. The method of claim 1, further comprising:
identifying the first MAC-CE as being included in a MAC subPDU that is first in a subPDU concatenation within the MAC PDU packet.

5. The method of claim 1, further comprising:
identifying the first MAC-CE as a temporally first MAC-CE within the MAC PDU packet.

6. The method of claim 1, further comprising:
identifying the first MAC-CE as being included in a temporally first CBG of the set of CBGs.

7. The method of claim 1, further comprising:
identifying the first MAC-CE as being included in a temporally last CBG of the set of CBGs.

8. The method of claim 1, further comprising:
identifying the first MAC-CE as being included in each CBG of the subset of CBGs or as being included in a temporally first code block (CB) within each CBG of the subset of CBGs.

9. The method of claim 8, further comprising:
receiving a retransmission of the subset of CBGs that excludes the first MAC-CE based at least in part on decoding a CB that includes the first MAC-CE or decoding a CBG that includes the first MAC-CE.

10. The method of claim 8, further comprising:
receiving a retransmission of one or more CBGs of the subset of CBGs that exclude the first MAC-CE based at least in part on a presence of an indicator within the subset of CBGs.

11. The method of claim 2, further comprising:
identifying, within the subset of CBGs, respective code blocks (CBs) that include a MAC-CE based at least in part on a set of bits appended to each of the respective CBs, wherein decoding the one or more MAC-CEs is based at least in part on identifying the respective CBs.

12. The method of claim 2, wherein the subset of CBGs comprises a fixed number of CBGs that include the one or more MAC subPDUs.

13. The method of claim 1, wherein decoding the content of the one or more MAC subPDUs comprises:
decoding one or more MAC service data units (SDUs) carried by respective MAC subPDUs of the one or more MAC subPDUs.

14. The method of claim 1, further comprising:
receiving, from the wireless device, an indication of the decoding configuration; and
determining the decoding configuration based at least in part on the received indication.

15. The method of claim 14, wherein the indication is received via a master information block (MIB), a system information block (SIB), a radio resource control (RRC) message, a MAC-CE, a downlink control information (DCI) message, or a combination thereof.

16. The method of claim 1, further comprising:
receiving an indication of the decoding configuration via a temporally first downlink control information (DCI) message of a number of DCI messages, a DCI message having a first DCI size that is different from a second DCI size of a second DCI message, a plurality of DCI messages, or a combination thereof.

17. The method of claim 1, further comprising:
receiving a retransmission of the MAC PDU packet; and
determining a second subset of CBGs within the retransmission that include the one or more MAC subPDUs based at least in part on the decoding configuration.

18. The method of claim 1, further comprising:
determining the decoding configuration based at least in part on a size of the MAC PDU packet, a number of the set of CBGs, a maximum code block (CB) size, or a combination thereof.

19. The method of claim 1, further comprising:
determining a communication scheme based at least in part on at least one of a downlink control information (DCI) message or a radio network temporary identifier (RNTI); and
applying the decoding configuration based at least in part on the determined communication scheme.

20. The method of claim 19, wherein the determined communication scheme comprises ultra-reliable low latency communication (URLLC), enhanced mobile broadband (eMBB), or a combination thereof.

21. The method of claim 1, wherein the decoding configuration applies to a respective MAC subPDU of the one or more MAC subPDUs.

22. The method of claim 1, wherein the decoding configuration applies to each MAC subPDU of the one or more MAC subPDUs.

23. The method of claim 1, further comprising:
transmitting an acknowledgment based on decoding at least one CBG of the indicated CBGs that include the one or more MAC subPDUs.

24. An apparatus for wireless communication, comprising:
memory;
a transceiver; and
at least one processor, the at least one processor coupled with the memory and the transceiver, and the at least one processor configured to cause the apparatus to:
receive, via the transceiver and from a wireless device, a medium access control (MAC) protocol data units (PDU) packet comprising a set of code block groups (CBGs);
receive, via the transceiver, a first MAC-control element (MAC-CE) that indicates a decoding configuration for the set of CBGs, the decoding configuration indicating which CBGs of a subset of CBGs include one or more MAC sub-protocol data units (subPDUs), wherein the MAC PDU packet comprises a number of MAC subPDUs that include one or more MAC-CEs of a number of MAC-CEs within the MAC PDU packet, and wherein the decoding configuration comprises one or more rules for decoding the indicated CBGs that include the one or more MAC subPDUs MAC CEs, the one or more rules comprising a limit on the number of MAC-CEs within the MAC PDU packet, a size limit of each MAC-CE of the number of MAC-CEs within the MAC PDU packet, or a combination thereof; and decode content of the one or more MAC subPDUs based at least in part on the indicated CBGs of the subset of CBGs and the one or more rules.

25. The apparatus of claim 24, the at least one processor further configured to cause the apparatus to:

decode the one or more MAC-CEs included in respective MAC subPDUs of the one or more MAC subPDUs.

26. The apparatus of claim 24, the at least one processor further configured to cause the apparatus to:

decode one or more MAC service data units (SDUs) carried by respective MAC subPDUs of the one or more MAC subPDUs.

27. The apparatus of claim 24, the at least one processor further configured to cause the apparatus to:

receive, from the wireless device, an indication of the decoding configuration, wherein determining the decoding configuration is based at least in part on the received indication.

28. An apparatus for wireless communication, comprising:

means for receiving, from a wireless device, a medium access control (MAC) protocol data units (PDU) packet comprising a set of code block groups (CBGs);

means for receiving a first MAC-control element (MAC-CE) that indicates a decoding configuration for the set of CBGs, the decoding configuration indicating which CBGs of a subset of CBGs include one or more MAC sub-protocol data units (subPDUs), wherein the MAC PDU packet comprises a number of MAC subPDUs that include one or more MAC-CEs of a number of MAC-CEs within the MAC PDU packet, and wherein the decoding configuration comprises one or more rules for decoding the indicated CBGs that include the one or more MAC subPDUs, the one or more rules comprising a limit on the number of MAC-CEs within the MAC PDU packet, a size limit of each MAC-CE of the number of MAC-CEs within the MAC PDU packet, or a combination thereof; and means for decoding content of the one or more MAC subPDUs based at least in part on the indicated CBGs of the subset of CBGs and the one or more rules.

29. A non-transitory computer-readable medium storing code for wireless communication, the code comprising instructions executable by a processor to:

receive, from a wireless device, a medium access control (MAC) protocol data units (PDU) packet comprising a set of code block groups (CBGs);

receive a first MAC-control element (MAC-CE) that indicates a decoding configuration of the set of CBGs, the decoding configuration indicating which CBGs of a subset of CBGs include one or more MAC sub-protocol data units (subPDUs), wherein the MAC PDU packet comprises a number of MAC subPDUs that include one or more MAC-CEs of a number of MAC-CEs within the MAC PDU packet, and wherein the decoding configuration comprises one or more rules for decoding the indicated CBGs that include the one or more MAC subPDUs, the one or more rules comprising a limit on the number of MAC-CEs within the MAC PDU packet, a size limit of each MAC-CE of the number of MAC-CEs within the MAC PDU packet, or a combination thereof; and decode content of the one or more MAC subPDUs based at least in part on the indicated CBGs of the subset of CBGs and the one or more rules.

* * * * *